United States Patent
Williamson et al.

(10) Patent No.: US 7,908,626 B2
(45) Date of Patent: Mar. 15, 2011

(54) NETWORK BASED DIGITAL INFORMATION AND ENTERTAINMENT STORAGE AND DELIVERY SYSTEM

(75) Inventors: Louis D. Williamson, Denver, CO (US); Joseph Buehl, Studio City, CA (US); John W. Callahan, Broomfield, CO (US); John B. Carlucci, Boulder, CO (US); James A. Chiddix, New York, NY (US); Michael T. Hayashi, Aurora, CO (US); Kevin J. Leddy, Wilton, CT (US)

(73) Assignee: Time Warner Interactive Video Group, Inc., Stamford, CT (US)

( * ) Notice: Subject to any disclaimer, the term of this patent is extended or adjusted under 35 U.S.C. 154(b) by 0 days.

(21) Appl. No.: 10/263,015

(22) Filed: Oct. 2, 2002

(65) Prior Publication Data
US 2003/0208767 A1 Nov. 6, 2003

Related U.S. Application Data

(60) Provisional application No. 60/377,963, filed on May 3, 2002.

(51) Int. Cl.
*H04N 7/173* (2006.01)
(52) U.S. Cl. ............. 725/90; 725/88; 725/91; 725/92; 725/93; 725/94; 725/95; 725/96; 725/97; 725/98; 725/99; 725/100; 725/101; 725/102; 725/103; 725/104; 725/115; 386/6; 386/7; 386/8; 386/68; 386/69
(58) Field of Classification Search ............. 725/88, 725/90, 91–104, 115
See application file for complete search history.

(56) References Cited

U.S. PATENT DOCUMENTS

| | | | |
|---|---|---|---|
| 4,476,488 A | | 10/1984 | Merrell |
| 5,253,066 A | | 10/1993 | Vogel |
| 5,285,272 A | * | 2/1994 | Bradley et al. ............. 725/115 |
| 5,335,277 A | | 8/1994 | Harvey et al. |
| 5,357,276 A | | 10/1994 | Banker et al. |
| 5,371,551 A | | 12/1994 | Logan et al. |
| 5,377,051 A | * | 12/1994 | Lane et al. ............. 386/81 |
| 5,436,917 A | | 7/1995 | Karasawa |
| 5,477,263 A | * | 12/1995 | O'Callaghan et al. ....... 725/102 |

(Continued)

FOREIGN PATENT DOCUMENTS
WO WO 00/54506 9/2000
(Continued)

OTHER PUBLICATIONS

Kale, RFC 1180 "A TCP/IP tutorial", Jan. 1991, Spider Systems Limited, Section 4 "ARP".*

(Continued)

*Primary Examiner* — Jason P Salce
(74) *Attorney, Agent, or Firm* — Brandon N. Sklar, Esq.; Kaye Scholer LLP

(57) ABSTRACT

Live television broadcast and other information and entertainment programs, e.g., videos-on-demand (VOD), are provided to a user through a communications network, e.g., a cable network. A processing unit is employed at an headend of the communications network to respond to user requests for PVR-like functions, e.g., pausing, rewinding and fast-forwarding, to be performed on the program content being viewed. The processing unit in accordance with the invention causes a delivery of an appropriate version of the program content to meet such user requests.

66 Claims, 20 Drawing Sheets

U.S. PATENT DOCUMENTS

| | | | |
|---|---|---|---|
| 5,479,303 A * | 12/1995 | Suzuki et al. | 360/72.2 |
| 5,517,257 A * | 5/1996 | Dunn et al. | 348/734 |
| 5,543,927 A | 8/1996 | Herz | |
| 5,550,640 A | 8/1996 | Tsuboi et al. | |
| 5,559,549 A * | 9/1996 | Hendricks et al. | 725/50 |
| 5,579,183 A | 11/1996 | Van Gestel et al. | |
| 5,606,359 A * | 2/1997 | Youden et al. | 725/88 |
| 5,625,406 A | 4/1997 | Newberry et al. | |
| 5,659,350 A | 8/1997 | Hendricks et al. | |
| 5,671,386 A | 9/1997 | Blair et al. | |
| 5,687,275 A | 11/1997 | Lane et al. | |
| 5,699,360 A | 12/1997 | Nishida et al. | |
| 5,710,970 A * | 1/1998 | Walters et al. | 725/87 |
| 5,721,878 A * | 2/1998 | Ottesen et al. | 725/87 |
| 5,727,113 A | 3/1998 | Shimoda | |
| 5,729,648 A | 3/1998 | Boyce et al. | |
| 5,748,254 A | 5/1998 | Harrison et al. | |
| 5,771,335 A * | 6/1998 | Lee | 386/111 |
| 5,805,762 A * | 9/1998 | Boyce et al. | 386/68 |
| 5,805,763 A * | 9/1998 | Lawler et al. | 386/83 |
| 5,822,018 A | 10/1998 | Farmer | |
| 5,822,493 A | 10/1998 | Uehara et al. | |
| 5,850,218 A | 12/1998 | LaJoie et al. | |
| 5,915,068 A | 6/1999 | Levine | |
| 5,933,498 A | 8/1999 | Schneck et al. | |
| 6,005,603 A | 12/1999 | Flavin | |
| 6,046,760 A | 4/2000 | Jun | |
| 6,052,588 A | 4/2000 | Mo et al. | |
| 6,055,358 A | 4/2000 | Traxlmayr | |
| 6,065,050 A * | 5/2000 | DeMoney | 709/219 |
| 6,091,884 A | 7/2000 | Yuen et al. | |
| 6,108,002 A | 8/2000 | Ishizaki | |
| 6,115,532 A | 9/2000 | Saeki | |
| 6,118,922 A | 9/2000 | Van Gestel et al. | |
| 6,172,712 B1 | 1/2001 | Beard | |
| 6,177,931 B1 | 1/2001 | Alexander et al. | |
| 6,233,389 B1 * | 5/2001 | Barton et al. | 386/46 |
| 6,253,375 B1 * | 6/2001 | Gordon et al. | 725/88 |
| 6,259,736 B1 | 7/2001 | Chujoh et al. | |
| 6,314,572 B1 | 11/2001 | LaRocca et al. | |
| 6,324,338 B1 | 11/2001 | Wood et al. | |
| 6,327,275 B1 | 12/2001 | Gardner et al. | |
| 6,351,596 B1 | 2/2002 | Ostrover | |
| 6,370,319 B1 | 4/2002 | Matsumoto et al. | |
| 6,378,130 B1 * | 4/2002 | Adams | 725/95 |
| 6,389,218 B2 * | 5/2002 | Gordon et al. | 386/68 |
| 6,442,328 B1 | 8/2002 | Elliott et al. | |
| 6,445,738 B1 * | 9/2002 | Zdepski et al. | 375/240.01 |
| 6,510,554 B1 * | 1/2003 | Gordon et al. | 725/90 |
| 6,515,680 B1 | 2/2003 | Hendricks et al. | |
| 6,532,593 B1 * | 3/2003 | Moroney | 725/142 |
| 6,549,718 B1 | 4/2003 | Grooters et al. | |
| 6,609,253 B1 * | 8/2003 | Swix et al. | 725/88 |
| 6,643,053 B2 * | 11/2003 | Li et al. | 725/88 |
| 6,721,794 B2 | 4/2004 | Taylor et al. | |
| 6,771,317 B2 | 8/2004 | Ellis et al. | |
| 6,853,728 B1 | 2/2005 | Kahn et al. | |
| 6,938,268 B1 | 8/2005 | Hodge | |
| 6,965,724 B1 * | 11/2005 | Boccon-Gibod et al. | 386/68 |
| 7,024,678 B2 * | 4/2006 | Gordon et al. | 725/88 |
| 7,028,329 B1 | 4/2006 | Mizutani | |
| 7,409,140 B2 | 8/2008 | Rodriguez et al. | |
| 7,536,705 B1 | 5/2009 | Boucher et al. | |
| 7,614,066 B2 | 11/2009 | Urdang et al. | |
| 2001/0021926 A1 | 9/2001 | Schneck et al. | |
| 2002/0016970 A1 * | 2/2002 | Negishi et al. | 725/88 |
| 2002/0042924 A1 | 4/2002 | Adams | |
| 2002/0059621 A1 | 5/2002 | Thomas et al. | |
| 2002/0075402 A1 | 6/2002 | Robson et al. | |
| 2002/0104093 A1 | 8/2002 | Buehl et al. | |
| 2002/0107940 A1 | 8/2002 | Brassil | |
| 2002/0138831 A1 | 9/2002 | Wachtfogel et al. | |
| 2002/0174438 A1 * | 11/2002 | Cleary et al. | 725/100 |
| 2002/0191959 A1 | 12/2002 | Lin et al. | |
| 2003/0007092 A1 | 1/2003 | Sonner et al. | |
| 2003/0028882 A1 | 2/2003 | Davis et al. | |
| 2003/0048671 A1 | 3/2003 | Yoshikawa et al. | |
| 2003/0093800 A1 * | 5/2003 | Demas et al. | 725/90 |
| 2003/0118243 A1 | 6/2003 | Sezer et al. | |
| 2003/0149988 A1 * | 8/2003 | Ellis et al. | 725/87 |
| 2003/0159151 A1 | 8/2003 | Ikeda | |
| 2003/0172376 A1 | 9/2003 | Coffin, III | |
| 2004/0015999 A1 | 1/2004 | Carlucci et al. | |
| 2004/0040035 A1 | 2/2004 | Carlucci et al. | |
| 2004/0078817 A1 | 4/2004 | Horowitz et al. | |
| 2004/0078829 A1 | 4/2004 | Patel et al. | |
| 2004/0244058 A1 | 12/2004 | Carlucci et al. | |
| 2004/0255336 A1 | 12/2004 | Logan et al. | |
| 2005/0283800 A1 | 12/2005 | Ellis et al. | |

FOREIGN PATENT DOCUMENTS

| | | |
|---|---|---|
| WO | WO 01/56285 | 2/2001 |
| WO | WO 01/56285 A1 | 8/2001 |
| WO | WO 01/95621 A1 | 12/2001 |

OTHER PUBLICATIONS

Duso et al., Operating System Support for a Video-On-Demand File Service, Digital Equipment Corporation, p. 4 ("CMFAP".*

Roy Furchgott, "Don't want people to control their T.V.s?", The New York Times, Aug. 24, 2000, Section G, p. 1, col. 2, Circuits, 2000 The New York Times Company.

"PVR copyright concerns raised", Audio Week, Aug. 23, 1999, section: This Week's News, 1999 Warren Publishing, Inc.

Dale Buss, "Ultra TV", Brandmarketing, Sep. 1999, vol. VI, No. 9, p. 74, ISSN 1091-6962, 1999 Responsive Database Services, Inc. Business and Industry; 1999 Fairchild Publications.

Brian Lowry, "Television, as you like it; Today's gadgetry is smart enough to let viewers choose camera angles, or kick back and rewind as the action unfolds live. Watch it, and it watches back" Los Angeles Times, Feb. 13, 2000, section: Calendar, p. 8, Calendar Desk, 2000 Times Mirror Company.

Peter Thal Larsen, "Inside Track: TV viewers can box clever: Technology Video Recorders: personal video recorders will be a godsend for viewers. But what about the schedulers", Financial Times London Ed., Jun. 23, 2000, p. 18, ISSN 0307-1766, 2000 Responsive Database Services, Inc. Business and Industry; 2000 Financial Times Ltd.

Patricia Sabga; Charles Molineaux, "TiVo—CEO, CNNfn", transcript # 00090110FN-107 interview Michael Ramsay, The N.E.W. Show, Sep. 1, 2000, Fri. 5:18 p.m. EST, 2000 Cable News Network.

Mary Kathleen Flynn; Steve Young, "Interactive TV, CNNfn", transcript #00081407FN-111 interview Josh Bernoff, Digital Jam, Aug. 14, 2000, Mon. 8:08 p. m. EST, 2000 Cable News Network.

"More 'convergence' digital video recorders emerge", Video Week, Jun. 19, 2000, section: This Week's News, 2000 Warren Publishing, Inc.

"TiVo and replay sign cable deals to boost PVR distribution", Warren's Cable Regulation Monitor, Aug. 21, 2000, section: This Week's News, 2000 Warren Publishing, Inc.

"Future VOD role of studios vs. other companies debated", Video Week, Apr. 10, 2000, section: This Week's News, 2000 Warren Publishing, Inc.

Raymond Snoddy, "The TiVo—T.V.'s nemesis?", Times Newspapers Ltd., Sep. 1, 2000, section: Features, 2000 Times Newspapers Limited (the Times London).

Marc Gunther; Irene Gashurov, "When techology attacks!; Your T.V. is looking weird. Network executives are getting flustered. Viewing choices are exploding. That's what happens . . . ", Fortune, Mar. 6, 2000. section: Features/Television, p. 152, 2000 Time Inc.

"Independent study shows TiVo service increases enjoyment and changes people's attitudes towards T.V.", PR Newswire, May 2, 2000, 2000 FT Asia Intelligence Wire; 2000 PR Newswire.

\* cited by examiner

100

300

NETWORK BASED DIGITAL INFORMATION AND ENTERTAINMENT STORAGE AND DELIVERY SYSTEM

The present application claims under 35 U.S.C. 119(e) the benefit of U.S. Provisional Application No. 60/377,963 filed on May 3, 2002.

FIELD OF THE INVENTION

The invention relates to communications systems and methods, and more particularly to a system and method for delivering information and entertainment programs through a communications network, e.g., a cable network.

BACKGROUND OF THE INVENTION

Personal video recorders (PVRs), e.g., TiVO and ReplayTV devices, are popular nowadays, stemming from their capabilities of "pausing", "rewinding" and "fast-forwarding" live television (TV) broadcast while it is being recorded. They may also offer such other functions as "one-touch programming" for automatically recording every episode of a show for an entire season, "commercial advance" for automatically skipping through commercials while watching recorded broadcast, an "on-screen guide" for looking up recorded programs to view, etc. The PVRs may also suggest programs for recording based on a user's viewing habit.

With the advent of digital communications technology, many TV broadcast streams are transmitted in digital formats. For example, Digital Satellite System (DSS), Digital Broadcast Services (DBS), and Advanced Television Standards Committee (ATSC) broadcast streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single broadcast channel. A digital TV receiver may be used to decode an MPEG-2 encoded transport stream, and extract the desired program therefrom. The prior art PVRs take advantage of MPEG-2 compression of video and audio data to maximize use of their limited storage capacity.

MPEG-2 Background

In accordance with the MPEG-2 standard, video data is compressed based on a sequence of groups of pictures (GOPs), in which each GOP begins with an intra-coded picture frame (also known as an "I-frame"), which is obtained by spatially compressing a complete picture using discrete cosine transform (DCT). As a result, if an error or a channel switch occurs, it is possible to resume correct decoding at the next I-frame.

The GOP may represent up to 15 additional frames by providing a much smaller block of digital data that indicates how small portions of the I-frame, referred to as macroblocks, move over time. Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 metadata describing the transport stream. The MPEG-2 metadata includes a program associated table (PAT) that lists every program in the transport stream. Each entry in the PAT points to a program map table (PMT) that lists the elementary streams making up each program. Some programs are open, but some programs may be subject to conditional access (encryption) and this information is also carried in the MPEG-2 metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counts are implemented to ensure that every packet that is needed to decode a stream is received.

SUMMARY OF THE INVENTION

Although prior art PVRs offer such attractive functions as pausing, rewinding and fast-forwarding "live" TV broadcast (collectively hereinafter "PVR-like functions"), we have recognized certain disadvantages associated with use of the PVRs. For example, one such disadvantage is that like a VCR, a PVR is a standalone device which requires yet another remote control to operate the device, in addition to those remote controls for a TV set, set-top box, DVD player, VCR, etc., which already proved to be confusing to a user. Another disadvantage is that a prior art PVR only records (a) the last X minute program material played on the channel to which the user actually tunes, where X represents a limited value, and (b) desired programs which need to be identified to or by the PVR in advance of their broadcast. Thus, any program material other than (a) or (b) is not recorded by a PVR, thereby limiting the materials that a user can review. For example, the PVR user cannot review any unrecorded program although recommended by a friend after its broadcast. Still another disadvantage is that limited by the number of tuners therein, a prior art PVR is not capable of recording programs in their entirety which have overlapping broadcast times and the number of which is greater than the number of tuners, thereby further limiting the materials that a user can review.

The invention overcomes the prior art limitations by providing network-based interactive programming and services. For example, in delivering content of a program to a terminal at a user location according to a broadcast schedule, the program content in accordance with the invention is recorded at a location, e.g., a headend, remote from the user location. When a request for performing an action, e.g., a PVR-like function, on the content of the in-progress program from the terminal, the recorded program content is manipulated to meet such a request.

The user may also reserve, for later review, not only in-progress programs and future programs as in prior art, but also previously broadcast programs since they have been recorded at the headend regardless of any user request. In addition, by removing the program recording function from a local device, e.g., a prior art PVR, to the network, the user no longer needs to be bothered with the local device (or its remote control for that matter), and may also reserve programs having overlapping broadcast times. Thus, with the invention, a user advantageously can enjoy any desired programs anytime, thereby transcending traditional program schedule limitations.

It is an object of the invention to provide interactive functions, e.g., PVR-like functions, to enhance a user's program enjoyment. It is another object of the invention to provide effective user interfaces for realizing such services as program reservation, music and video on-demand services, searching, media content downloads, distance learning, out-of-market programming, picture-in-picture (PIP) programming, on-line commerce, etc. It is still another object of the invention to facilitate effective organization of, and access to, programming information. To that end, a user is provided, e.g., with an interactive program guide for quickly accessing program line-up information, and graphical user interfaces (GUIs) for organizing favorite shows, program channels, etc. It is a further object of the invention to receive user feedbacks on programs and commercials for statistical analysis. It is another object of the invention to take advantage of the network communications facilities to provide a messaging service to the network users.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

Figure 1:
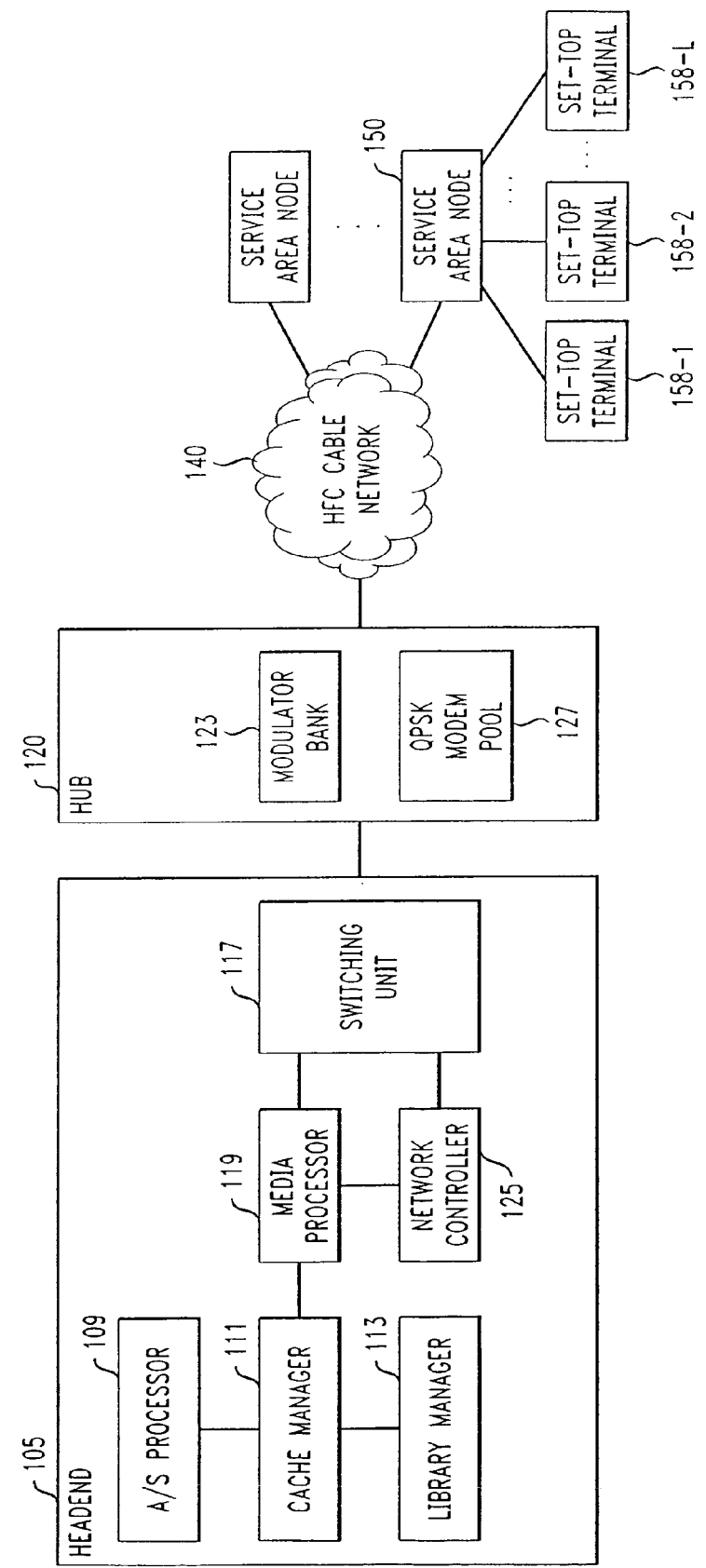
FIG. 1 is a block diagram of a broadband communications system in accordance with the invention.

FIG. 1 illustrates broadband communications system 100 embodying the principles of the invention for providing interactive programming and services to users. For example, system 100 in this instance includes a cable system for delivering, in accordance with the invention, information and entertainment to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Acquisition/Staging (A/S) processor 109 in headend 105 processes program materials including, e.g., TV streams, from one or more of the aforementioned sources in analog and digital forms. Analog TV streams may be formatted according to the National Television Standards Committee (NTSC) or PAL broadcast standard. Digital TV streams may be formatted according to the Digital Satellite System (DSS), Digital Broadcast Services (DBS), or Advanced Television Standards Committee (ATSC) standard. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 14 to view program material provided by ESPN; program channel 32 to view program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive "assets" including pre-staged movie videos, news reports, sports events, etc. from content providers. However, in accordance with the invention, processor 109 may also create "assets" in real time while processing received program materials which are not pre-staged by the content providers. In general, an "asset" is a container for any object or set of objects that may be desired to implement a service, including video, audio, images, application executables, scripts, configuration files, text, fonts, and HTML pages. In addition to the raw content, metadata (not to be confused with MPEG-2 metadata) is also a part of an asset object that describes characteristics of the asset. For example, asset metadata may describe attributes that are inherent in the content of the asset, such as the rating, format, duration, size, or encoding method. Values for asset metadata are determined at the time the asset is created.

Figure 2:
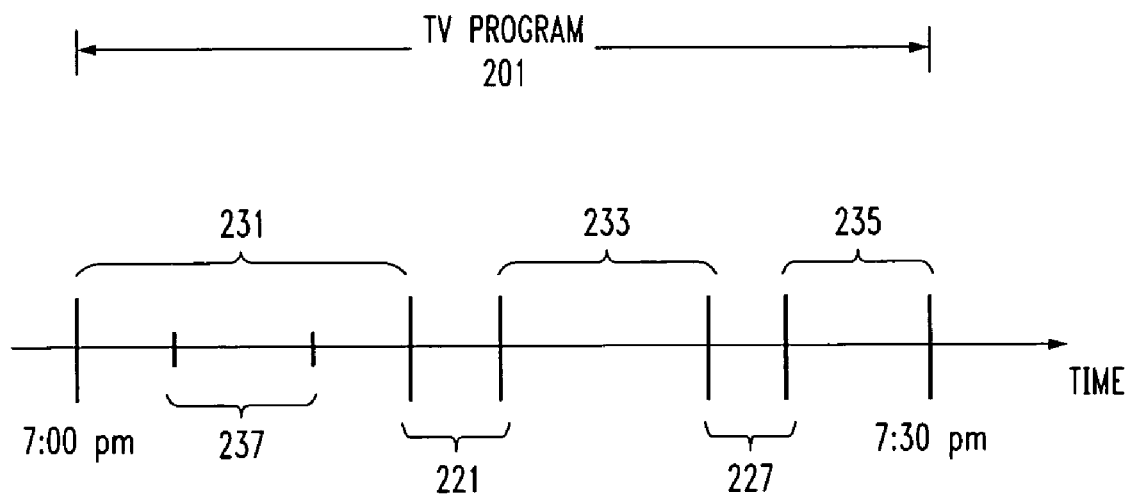
FIG. 2 illustrates a TV program comprising multiple program segments which is provided in the system of FIG. 1.

In this illustrative embodiment, an asset concerning a program includes a metadata file and trick files associated with the program, in addition to the program content contained in a transport stream. FIG. 2 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. In accordance with an aspect of the invention, the TV streams received by processor 109 are pre-processed, e.g., by the providers, to include indicators, e.g., cue-tones, on which processor 109 relies to identify the demarcations (or edges) of different programs and program segments within each program. Thus, in this instance before processor 109 processes the TV stream containing TV program 201, a first cue-tone is inserted at the beginning of segment 231, indicating the beginning of TV program 201; second cue-tones are inserted at the beginnings of segments 221 and 227, indicating the beginnings of the respective commercial breaks; third cue-tones are inserted at the ends of segments 221 and 227, indicating the ends of the respective commercial breaks; and a fourth cue-tone is inserted at the end of segment 235, indicating the end of TV program 201. In accordance with another aspect of the invention, another set of cue-tones may be inserted to delimit a "chapter" (denoted 237) within a program. A chapter is a self-contained subprogram, e.g., a skit, monolog, song performance, news report, weather report, etc. within a program. With the cue-tones defining one such chapter, processor 109 is capable of identifying the chapter and create an asset concerning the same.

Let's assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109 while processing TV program 201 may locate the corresponding program guide data to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with program 201 as part of the asset which are used to perform PVR-like functions (e.g., rewinding and fast-forwarding) on program 201 in accordance with the invention. One such trick file in this instance is a "fast-forward" trick file which contains an array of identifiers of I-frames in the program stream (MPEG-2 encoded as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user (described below), and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Otherwise, a "cache miss" causes locating the requested program in the library storage, thereby incurring a delay in the retrieval of the program.

Network controller 125, among others, assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 125 may change after a system reconfiguration. Nevertheless, each set-top terminal and controller 125 is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 3:
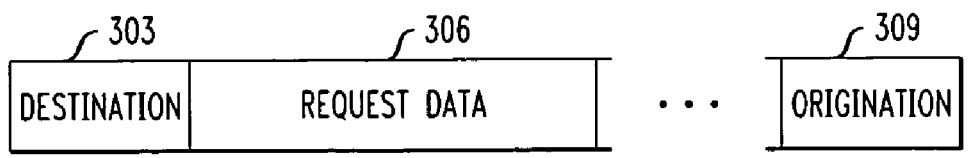
FIG. 3 illustrates a request for program material from a set-top terminal in the system of FIG. 1.

Continuing the above example, once the TSIDs of the transport streams are detected, terminal 158-1 sends through QPSK modem pool 127 a request for program channel 2 material. FIG. 3 illustrates one such request (denoted 300) sent from a set-top terminal to network controller 125 via an RDC. As shown in FIG. 3, request 300 includes, among others, destination field 303 which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
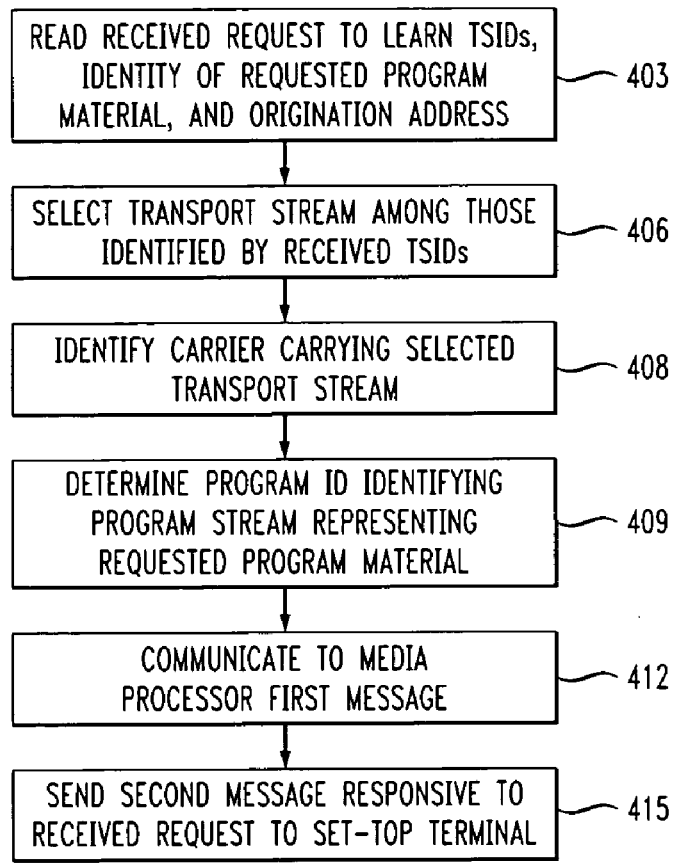
FIG. 4 is a flow chart depicting a process for providing program material in response to the request of FIG. 3.

After receiving request 300, network controller 125 reads the received request to learn the TSIDs, the identity of the requested program material, and the origination address therein, as indicated at step 403 in FIG. 4. Network controller 125 communicates with media processor 119 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 5:
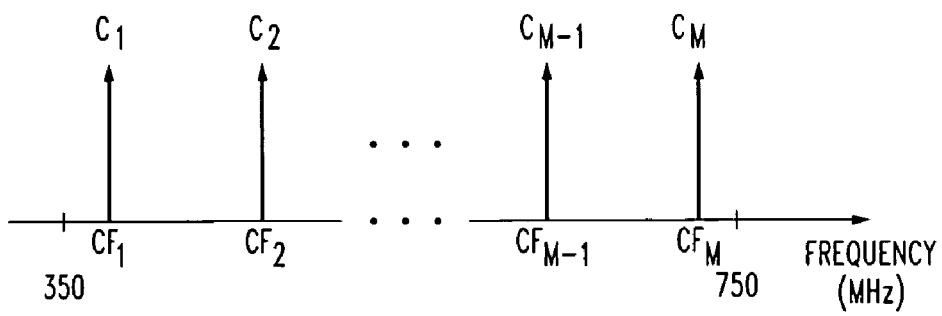
FIG. 5 illustrates selected carriers for transmitting program materials in a forward passband of the system of FIG. 1.

Referring also to FIG. 1, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 5 illustrates M carriers, $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate up to 9 program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel, network controller 125 at step 409 determines the program ID identifying the program stream representing the requested program material, i.e., program channel 2 material in this instance, which is then multiplexed with other program streams in the selected transport stream. At step 412, network controller 125 communicates to media processor 119 a first message containing the identity of the modulator in modulator bank 123 which corresponds to the carrier, say, $C_1$, just determined, and the program ID associated with the requested program channel material just determined. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the carrier $C_1$ with the received transport stream, and causes transmission of the modulated carrier through the transmission channel associated with $CF_1$.

Based on the information in the second message, terminal 158-1, having a single tuner therein in this instance, tunes to the carrier frequency $CF_1$ to receive the transmitted transport stream, and extracts therefrom the desired program stream, representing program channel 2 material in this instance. In a well known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

Figure 6:
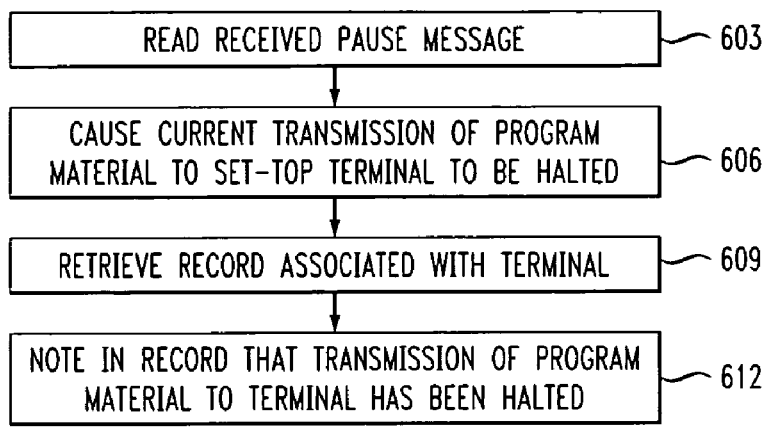
FIG. 6 is a flow chart depicting a process for pausing a program in response to a pause message from a set-top terminal.

When the user issues a pause command to terminal 158-1, e.g., by pressing a "pause" key on a remote control whose signal is receivable by an interface in terminal 158-1, to temporarily stop the progress of the program, terminal 158-1 in response issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. After receiving the pause message, processor 119 reads the received pause message, as indicated at step 603 in FIG. 6. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
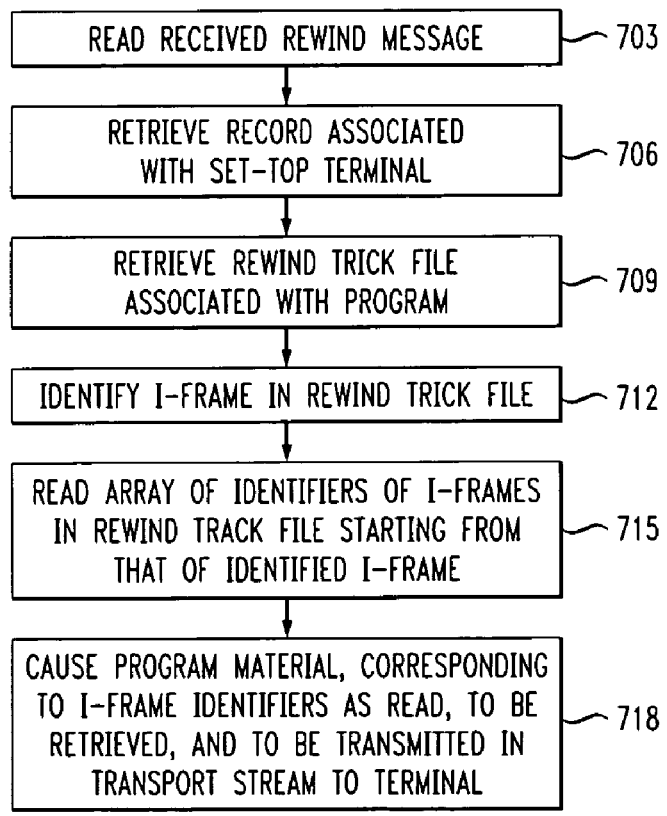
FIG. 7 is a flow chart depicting a process for rewinding a program in response to a rewind message from a set-top terminal.

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. After receiving such a rewind message, processor 119 reads the received rewind message, as indicated at step 703 in FIG. 7. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Figure 8:
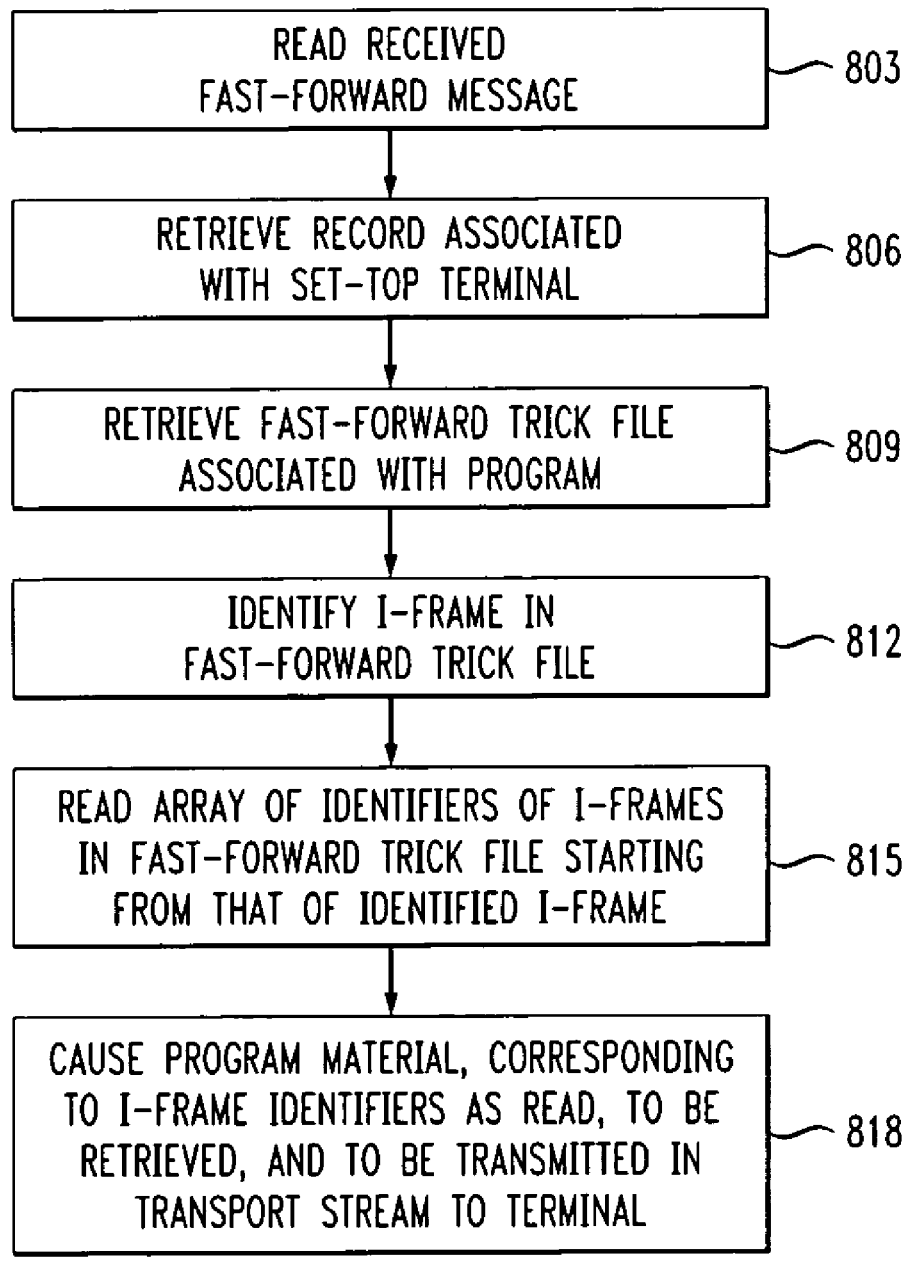
FIG. 8 is a flow chart depicting a process for fast-forwarding a program in response to a fast-forward message from a set-top terminal.

After rewinding a program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a fast-forward initiation command, the last I-frame identifier registered by terminal 158-1, and the IP address (and/or MAC address) identifying terminal 158-1. After receiving such a fast-forward message, processor 119 reads the received fast-forward message, as indicated at step 803 in FIG. 8. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

It should be pointed out at this juncture that in the above illustrative embodiment, the transport streams generated by processor 109, which contain, e.g., live TV broadcast, are recorded in cache manager 111, followed by library manager 113, before they are fed to the requesting set-top terminals. As a result, the transport streams received by the terminals actually are recorded copies of the streams generated by processor 109. However, in a second embodiment, the transport streams generated by processor 109 are fed to the requesting set-top terminals in real time, and at the same time switched to cache manager 111 and library manager 113 for recording thereof. Thus, in this second embodiment, when a user at a set-top terminal performs a PVR-like function on an in-progress TV broadcast program, say, rewinding the program, the real-time transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced back by the real-time transport stream containing the in-progress program.

Based on the disclosure heretofore, it is apparent to a person skilled in the art that the above-described interactivities between a set-top terminal and media processor 119 and/or network controller 125 in serving a TV broadcast program similarly apply to serving of other types of asset, e.g., a music video, news event, weather report, traffic report, sports event, video-on-demand (VOD), an audio-on-demand, etc. For example, the VOD assets may be stored in the library storage in library manager 113. In serving a VOD requested by a user, media processor 119 incorporates also other well known VOD server functions (e.g., receiving VOD requests, scheduling video presentations, etc.), retrieves a copy of the requested VOD from the library storage and caches the copy while serving the VOD. Subsequent requests for the same VOD would trigger a cache hit, thereby expediting the VOD presentation. In fact, in another embodiment, a number of caches, in addition to that in manger manager 111, are placed at selected delivery points in system 100, e.g., at an input to modulator bank 123, to cache any assets recently requested by, or delivered to, users in the hope that the same assets will be requested repeatedly because of their popularity, thereby increasing the chance of a cache hit.

Based on the disclosure heretofore, it is also apparent to a person skilled in the art that the above-described interactivities between a set-top terminal and media processor 119 and/or network controller 125 apply not only to carrying out the particular interactive PVR-like functions described above (e.g., pausing, rewinding and fast-forwarding), but interactive programming and services in general. To facilitate the realization of such programming and services, users at set-top terminals may be provided with on-screen user interfaces including, e.g., a Home graphical user interface (GUI), My Shows GUI, On-Demand GUI, Favorites GUI, Services GUI, What's Hot GUI, Music-On-Demand GUI, Sports GUI and Search GUI to be described.

Program Reservation

Figure 9:
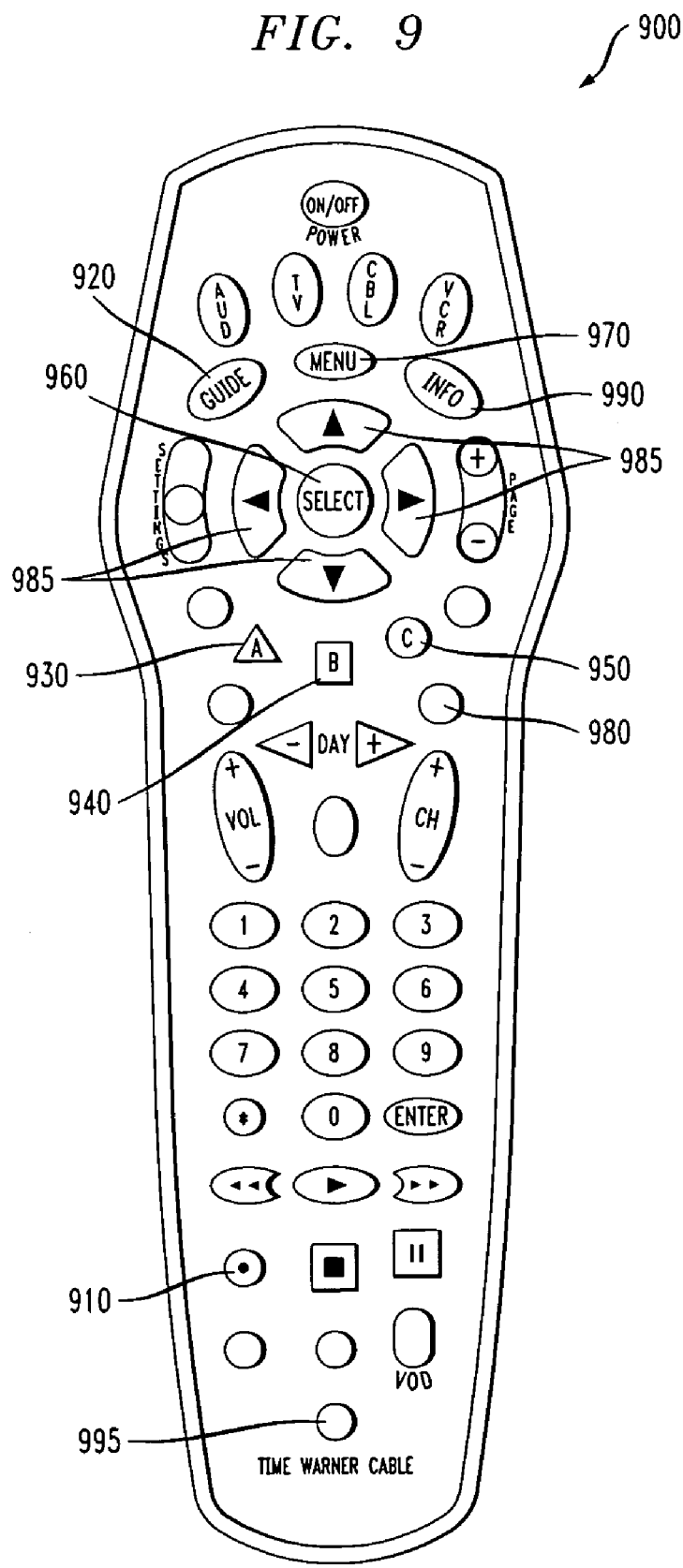
FIG. 9 is an illustration of a remote control according to one embodiment of the present invention.

One such interactive service is a "program reservation" service in accordance with the invention. This program reservation service enables a user to "reserve" programs (e.g., live or played back television programs, movies, music videos, etc.) or service displays (e.g., product information, commercials, web pages, etc.). As mentioned before, all broadcast programs in this instance are recorded at headend 105 and all on-demand and other content is stored at headend 105 as well. Referring to FIG. 9, when a user at a set-top terminal, say, terminal 158-1, presses record key 910 of remote control 900 associated with the terminal to save a program for subsequent viewing, set-top terminal 158-1, unlike a prior art PVR, does not actually record the program. Rather, in accordance with the invention, in response to the user depression of record key 910, terminal 158-1 marks the program or event that has been recorded and/or stored at headend 105. The marking information concerning the point of the program at which the user pressed key 910 is transmitted to media processor 119. Based on the received marking information and an IP address (and/or MAC address) identifying terminal 158-1, processor 119 retrieves the record associated with terminal 158-1, and notes in the record the reserved program, which is made available to the user for subsequent playback.

Figure 10:
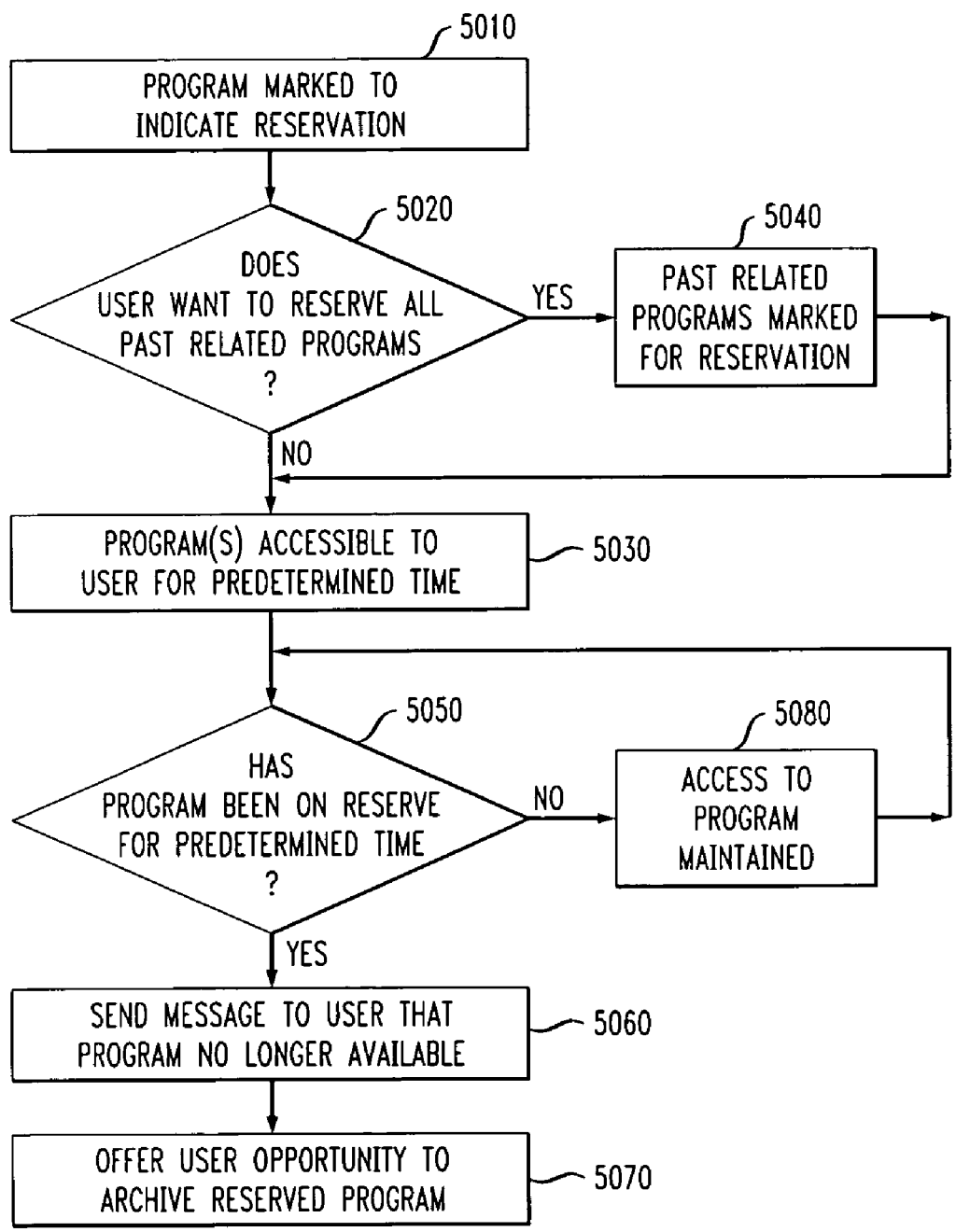
FIG. 10 is a flow chart depicting a program reservation process in a first embodiment of the invention.

In a particular illustrative embodiment, referring to FIG. 10, when the user reserves a program that is in progress, terminal 158-1 marks the entire program for display as well as the point at which the user pressed record key 910 (step 5010). On playback, the user has the option to begin viewing either at the beginning of the program or at the point that the user pressed record key 910. In another embodiment, when key 910 is pressed, a menu including different record options for selections is displayed on the TV screen. One such record option may be "reserve all" which enables a user to reserve all related programs that are available. For example, the user may use select key 960 to select the "reserve all" option to reserve all episodes of a particular TV show, which include all past, in-progress and future episodes that are available for reservation (steps 5020, 5040).

It should be noted that using the inventive program reservation service, a user may advantageously reserve multiple programs having overlapping broadcast times. As such, system 100 is superior to prior art PVRs in that, among others, limited by the number of tuners therein, the PVRs are not capable of recording time-overlapping programs in their entirety whose number is greater than the number of tuners, and retrieving previously unrecorded broadcast programs. It should also be noted that reserving a program here does not interfere with a user's ability to watch and/or interact with other programs.

The inventive program reservation service enables a user to reserve past, current and future programs. When a user reserves a program that was broadcast in the past, the user may add the program to a My Shows list (described below) and can play the program from the beginning of the program or from any other point of time within the program. If the user reserves a currently broadcast (or in-progress) program, the program is also added to the user's My Shows list and the user can continue to watch the program "live" or can watch any portions of the show that has already been broadcast. If the user reserves a future program, the program is added to the user's My Shows list for viewing at the time of program broadcast or after the program is broadcast. Regardless of whether the reserved program is a past, current or future program, the user has the choice of watching any channel (e.g., other than the dedicated playback channel for the reserved program) at the time of the reservation and can choose the period in which the reserved program is to be viewed.

In another embodiment, the period in which a reserved program can be viewed may be limited to a predetermined amount of time (e.g., two weeks) from the program reservation date (5030). In that embodiment, all users who reserve a program will have access to the program for the same amount of time (i.e., three weeks) regardless of the broadcast date, as long as the program is reserved within the available time frame. If the predetermined amount of time has not passed (5050), access to the program is maintained (5080). However, once media processor 119 determines that the program has been on reserve for the predetermined amount of time (5050), a message may be sent to the user indicating that the program will no longer be available (5060) and offering the user the opportunity to archive the reserved program (5070). Archiving a program permits a user accessibility to the program for an extended period of time (e.g., up to one or more years from broadcast) and may be for a fee. In another embodiment, the user may archive the program by downloading it to storage at the user's site, e.g., on a DVD player, VCR or PVR connected to or integrated into terminal 158-1.

In accordance with another aspect of the invention, the program reservation service allows a user to reserve any program within a predetermined period after the program's broadcast. System 100 may make a program available for reserving and viewing within a limited time (e.g., two weeks) from the broadcast date, subject to the rights negotiated by the content provider. In such an instance, the more time that transpires since a program is broadcast, the less time the user would have to view the program, assuming the program is still available to be reserved. In any event, a notice may be issued to users, notifying the users about the programs which are about to expire for reservation, e.g., 24 hours before their expiration.

Figure 11:
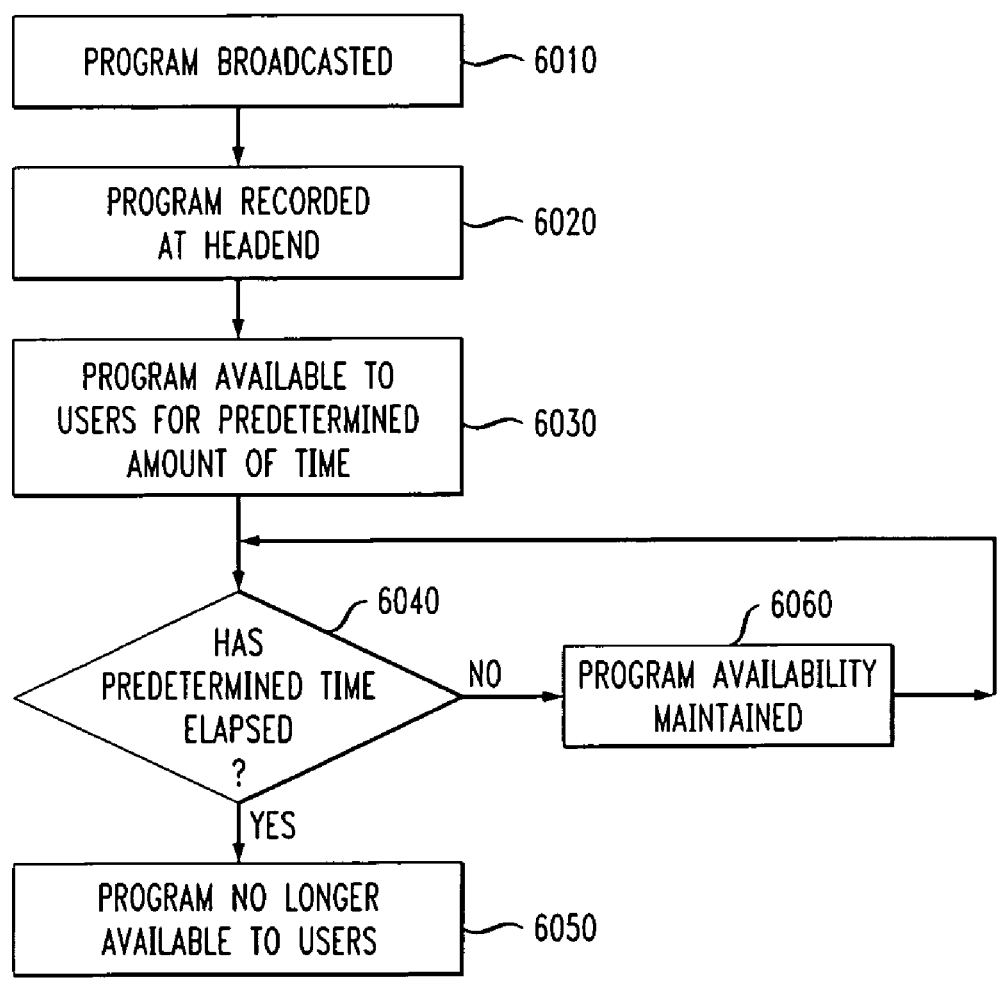
FIG. 11 is a flow chart depicting a program reservation process in a second embodiment of the invention.

Referring to FIG. 11, once a program is broadcast (6010), it is recorded at headend 105 (6020) and the program may be accessible to the user for a predetermined amount of time (6030). If the predetermined time from when the program is broadcast has yet to lapse (6040), program availability is maintained (6060). When, however, media processor 119 determines at that predetermined amount of time has lapsed, the program is no longer available to users (6050).

Once a program has been reserved, the user can navigate through the program by performing the PVR-like functions described above. The user may therefore play, pause, stop, fast-forward and rewind the reserved program. If the entire length of a program has been broadcast, then all of these PVR-like functions are operational for that program. If, however, a show is in progress, the fast-forward function is operational to the extent that the show has been broadcast. In other words, the user cannot fast-forward the portion of the show that has not been broadcast. Nevertheless, the play, pause, stop and rewind functions are fully operational when viewing a reserved in-progress program.

It should be noted that a user may, instead of reserving a program locally at terminal 158-1 in the manner described above, a user may reserve a program remotely, e.g., through the Internet, World Wide Web (WWW), a public switched telephone network (PSDN), wireless telephone network, or other communications network.

Other interactive programming and services, including My Shows, Favorites, Special Services, Customized Settings, "What's Hot", On-Demand services, searching, etc. to be described, may similarly be accessed using remote control 900 locally or via a communications network remotely.

Figure 12:
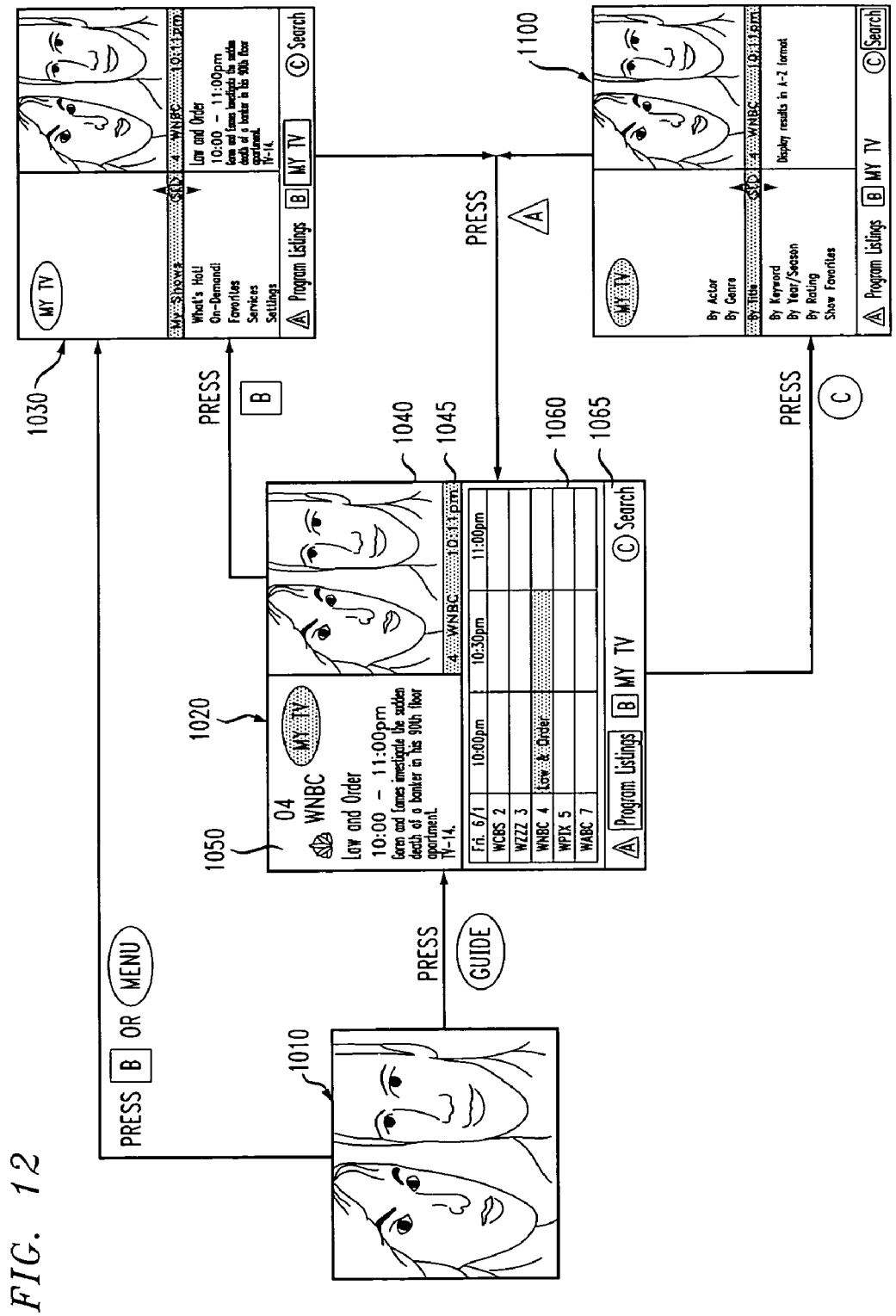
FIG. 12 illustrates screen displays in accessing Home and Search graphical user interfaces (GUIs) in accordance with the invention.

For example, by pressing guide key 920 on remote control 900 while viewing a program channel display 1010 in FIG. 12 (which may be a live or played back TV show, movie, music video, service or the like), a user may access interactive program guide 1020, which includes program viewing window 1040, current time and channel indicator 1045, program description box 1050, program grid 1060 and menu display 1065. In one embodiment, menu display 1065 lists three menu choices available to the user. By pressing key 940 labeled "B," the available interactive services are displayed at expanded Home GUI 1030. Alternatively, by pressing key 950 labeled "C," the interactive search services are made available at Search GUI 1100. The user may return to the interactive program guide 1020 from either expanded Home GUI 1030 or Search GUI 1100 by pressing key 930.

The interactive program guide 1020 may be, e.g., a time/channel-based guide that provides a user with time and channel information regarding specific shows. In addition to enabling a user to view such information with respect to in-progress and upcoming programming, interactive program guide 1020 permits users to view information concerning previously broadcast programs. Such information is particularly useful to a user for reserving past programs. Accordingly, in one embodiment, interactive program guide 1020 lists all previously broadcast programs for a predetermined amount of time into the past, some but not all of which may be reserved, in accordance with the negotiated content rights. In another embodiment, interactive program guide 1020 lists only those previously broadcast programs that are available for reservation.

Further, additional interactive program guides may be made available to a user based on geographic location. For example, users may not be limited to only view channel and time information for programs that are broadcast to the geographic area in which the user is currently located; instead, the user may choose to view such programming information in other geographic areas (out of market). Such a feature may be particularly useful if the user is traveling to an area outside the user's geographic region.

Again, the user may return to the programming or services features by selecting "B" key 940 or "C" key 950, respectively. The interactive programming and services offer users access to personalized programming content which can be accessed through the user interface and the functionality of such programming and services is described more fully below. Further, the interactive searching services enable a user to initiate a search for content and is also further described below.

My Shows

Figure 13:
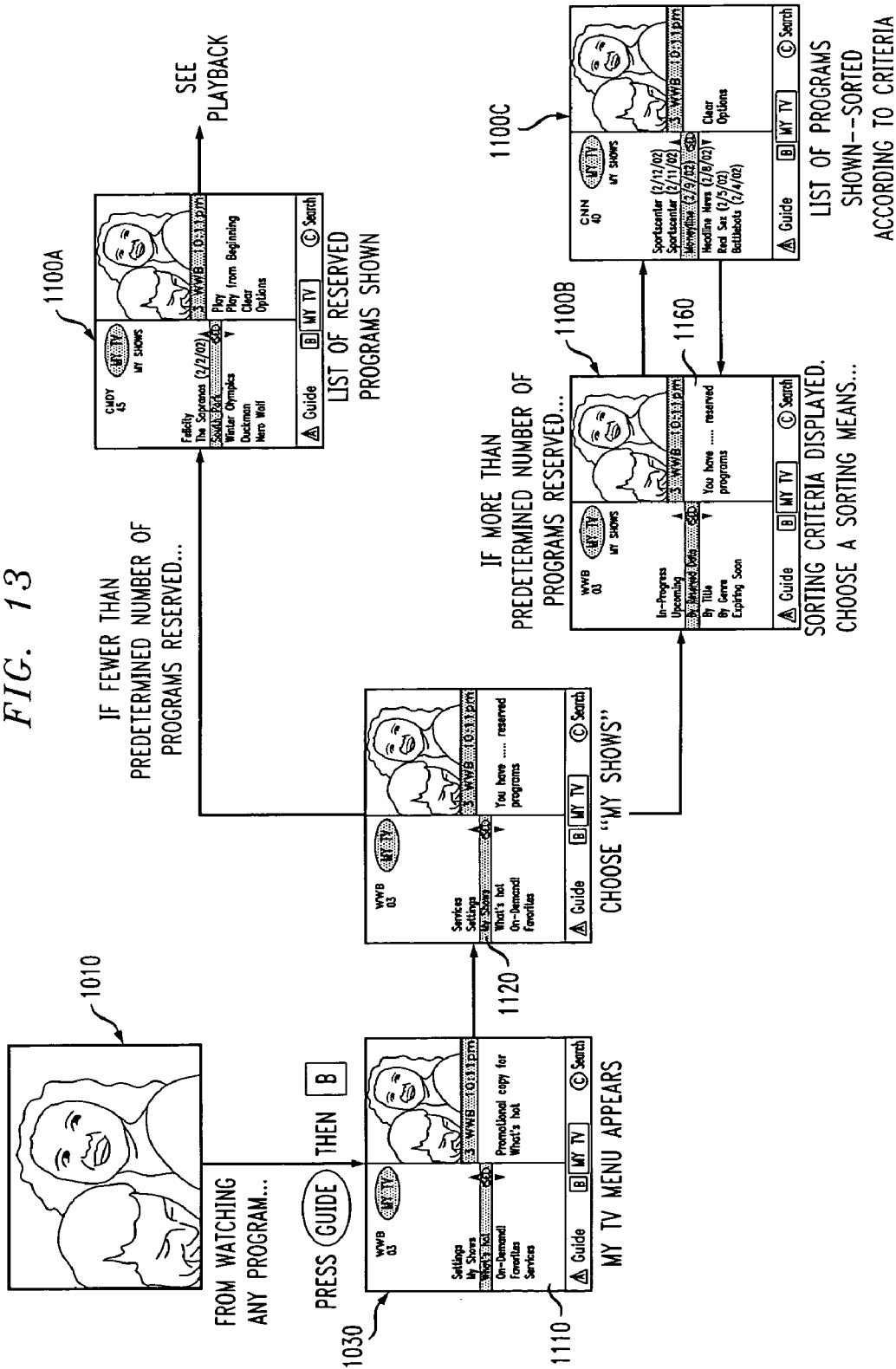
FIG. 13 illustrates screen displays in accessing a My Shows GUI in accordance with the invention.

A My Shows GUI provides a user with a list of available programs that have been reserved by the user. In the case where multiple users in a household are served by a set-top terminal, each user may utilize the My Shows GUI to create his/her own list of reserved programs. Referring to FIG. 13, when a user reserves a program, the reserved program are listed in the "My Shows" GUI (e.g., 1100A, 1100C) accessible from Home GUI 1030. In one embodiment, the My Shows GUI enables a user to find, sort and manage programs, including reserved programs (i.e., programs that have already been reserved and are currently available for viewing), upcoming programs (i.e., programs that are scheduled to be reserved but have yet to be broadcast) and recommended programs (i.e., programs that the system reserves automatically based on user profile).

While viewing channel display 1010 in FIG. 13, a user may access Home GUI 1030 by pressing guide key 920 and then "B" key 940 of remote control 900. At Home GUI 1030, a user at terminal 158-1 is prompted to select one of the programming features listed in menu 1110. By selecting My Shows feature 1120 in menu 1110, a user is able to access My Shows GUI exhibiting the programs that have been reserved. In one embodiment, this may be accomplished by pressing select key 960 of remote control 900 when My Shows feature 1120 is highlighted in Home GUI 1030.

In one embodiment, when My Shows feature 1120 is selected and fewer than a predetermined number programs (e.g., seven programs) have been reserved by a user, all of the reserved shows are immediately listed in My Shows GUI 1100A. If, however, more than a predetermined number of programs have been reserved, the user's shows may be organized by categories. For example, My Shows GUI 1100B lists several categories to assist a user in locating a program through the My Shows feature. Some of these categories may be temporal in nature; that is, a user's reserved programs may be categorized by those programs that are in-progress (i.e., currently broadcast), upcoming (i.e., to be broadcast in the future) or by the reservation date of the program. In one embodiment of the invention, programs that are categorized by reservation date are listed in chronological order beginning with shows that have been most recently reserved (1100C) or in reverse chronological order.

Other categories of program listings are available. For example, programs in the My Shows list may be organized by title, which is an alphabetical listing of reserved programs by program title. Programs may also be organized by genre such that reserved programs are listed by program content type such as comedy, drama, action, sports and the like. Further, a user may access a list of reserved shows that are set to expire within a few days (i.e., expiring soon programs).

As users scroll through programs listed in My Shows GUI 1100A, 1100C, the following information may be shown for the highlighted show: program title, short description of the program, channel name (including call letters), channel number, broadcast date for past reserved programs, broadcast time for current and future reserved programs, rating (such as G, PG-13 and R), and the program running time.

After viewing the listed programs in My Shows GUI 1100A, 1100C, the user can select current and past programs for viewing, designating it as a "Favorite" as described with reference to FIG. 15 below, find similar programs, archive program to a tape, DVD, etc., or designate programs for their deletion. Further, future programs that have been reserved may also be designated as a Favorite, selected for finding similar programs, archived to a tape or designated for their deletion.

On-Demand

An On-Demand GUI provides a user with an interactive capability to reserve and play movies, premium TV programming as well as certain news and other television programming without a time parameter since such movies and programming is available on-demand. Once broadcasting of a program or movie has begun, the user can watch the content as it is being broadcast for the first time or at any time thereafter as long as it is still available (i.e., has yet to expire), subject to the rights negotiated by the content provider.

Figure 14:
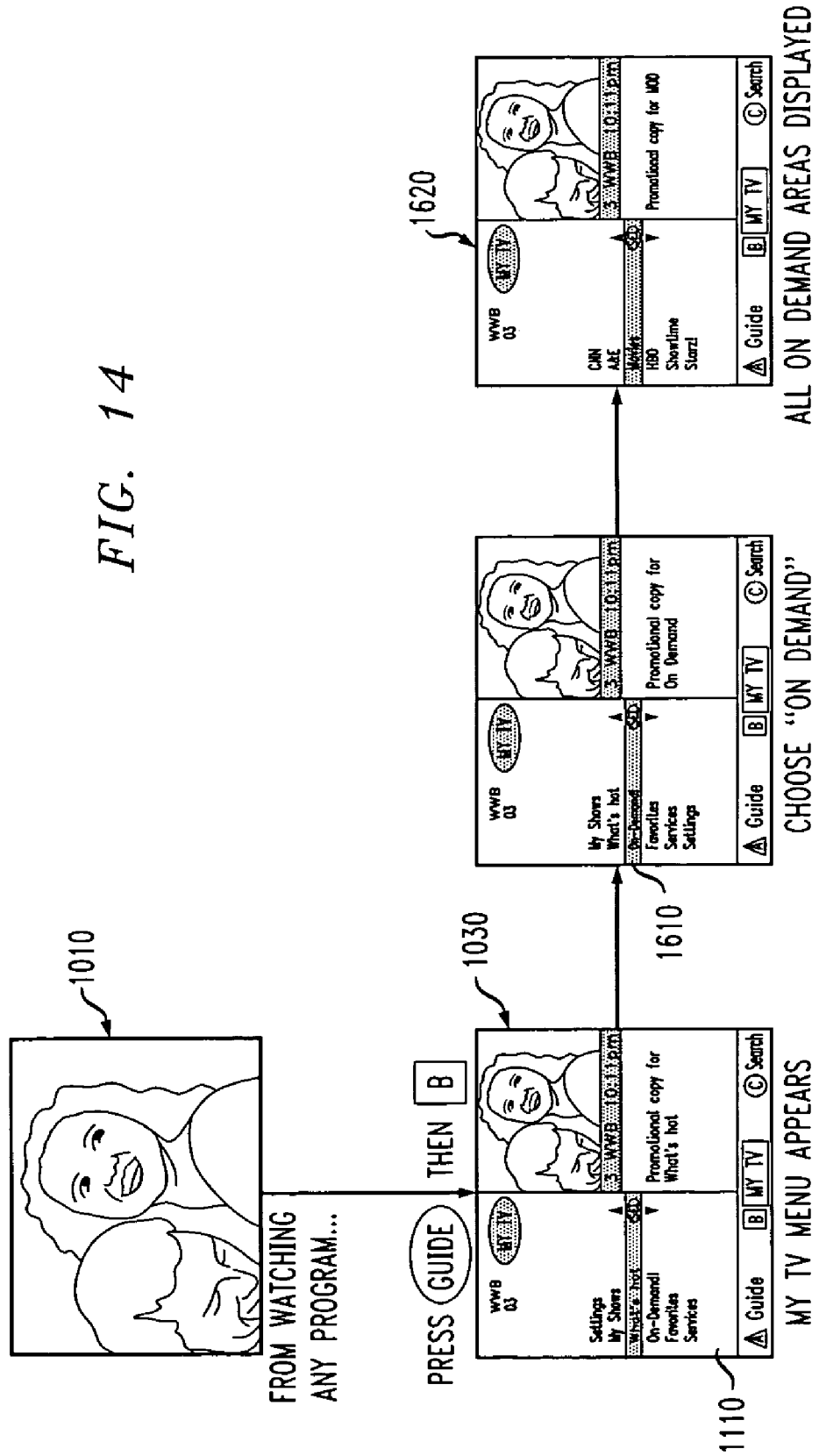
FIG. 14 illustrates screen displays in accessing an On-Demand GUI in accordance with the invention.

FIG. 14 illustrates accessing the On-Demand feature through the user interface. From viewing a first channel GUI 1010, a user may access home GUI 1030 by pressing guide key 920 and then "B" key 940 of remote control 900. At home GUI 1030, a user is then prompted by terminal 158-1 to select one of the programming features listed in menu 1110. By selecting On-Demand feature 1610, a user is presented with choices of premium movie channels (such as HBO, Showtime, Star/Encore and the like), a menu item labeled "Movies," specialized channels (such as music, music videos, weather, and the like) and "Free" channels (such as CNN, A&E, and the like). Viewers can then select an On-Demand channel from the listed premium movie channels, "Movies" channel, specialized channels or free channels.

Free channels require no purchase by the user, whereas premium movie channels and individual Movies typically do require a purchase by the user. Although premium movie channels require a purchase beyond the basic cable service fee, the fees associated with these channels are paid in advanced through a subscription service. When a purchase of an individual movie is required, however, the user is prompted on the screen to input certain data (such as a personal identification number) to effectuate the purchase of the program. With respect to the specialized channels, some of these channels may require a subscription service purchase, some may require a specific program purchase and others may not require any purchase.

In one embodiment of the invention, on-demand programs may be accessed by a user at terminal 158-1 by choosing among different categories. For example, on-demand programs may be listed in the premium TV category for programs that have been or will be broadcast by a premium TV provider (such providers include HBO, Showtime, etc.). Programs listed in the premium TV category may be further categorized by programs that are in progress, by genre or by channel. Programs listed by channel includes, in one embodiment, an alphabetical listing of programs for each channel available to a user. Further, On-Demand movies may be listed in a movies category and may be listed alphabetically, by actor or by genre. In addition to movies, TV series and news programs may also be reserved by a user on demand. Thus, the On-Demand feature enables a user to select programs for display that is convenient to the user's schedule, instead of a time that is designated by the content provider.

Illustratively, once a movie or program has been selected by the user, a screen is displayed describing specific features of the movie or program selected. For example, when a movie is selected on demand for possible purchase, information concerning the selected program may be displayed, including: the movie's title, a description of the movie, the movie rating, running time and the like. Additional information about the movie may be accessed by pressing info key 990 of remote control 900. This additional information may include, a more detailed description of the selected movie, a listing and description of the actors in the movie and a video preview of the movie.

Similar to a reserved program, once an On-Demand program has been ordered, the user can navigate through the program in a manner similar to watching a movie on a PVR. The user may therefore be able to play, pause, stop, fast forward and rewind the reserved program.

In one embodiment, access to a program may be terminated upon reaching one of the following scenarios. If, for example, an entire program is played and not as a result of the fast-forward key, media processor 119 may determine that the program is complete and access to the program is terminated. At this point, the user may be prompted to request an additional program on demand. Access to a program may also be terminated if media processor 119 determines that a predetermined time interval (expiration period) has been met. Typically, a reminder is displayed on the user's screen notifying the user that the time to view a program will be terminated at a specified time in advance of such expiration.

Favorites

In this illustrative embodiment, a user (or each of multiple users in a household as the case may be) may establish one or more personal profiles that enable users to sort content and channels by the user's personal content preferences. For example, users can define their favorite programs in profiles which are comprised of lists of criteria for sorting program content. Through the user interface, users can then search program data for content that matches the criteria in a user's profile and return the results to the user's lists of Favorite programs. Profiles may be defined by one or more criteria, including actor, program category (TV show, movie, etc.), director, genre, keyword, title or the like.

Figure 15:
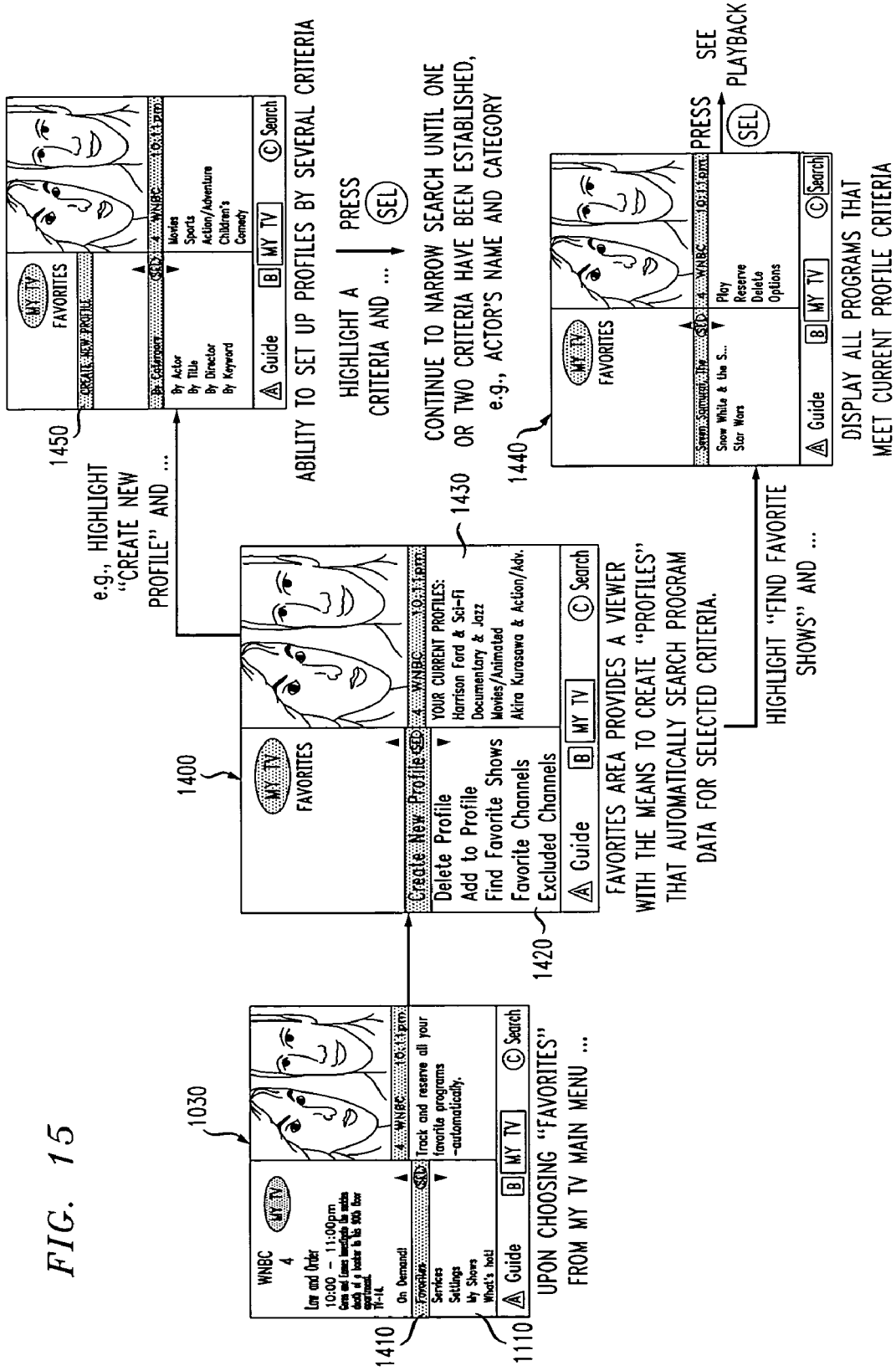
FIG. 15 illustrates screen displays in setting up a profile in a Favorites GUI in accordance with the invention.

Access to the Favorites features according to one embodiment is shown in FIG. 15. By accessing Home GUI 1030, a user is prompted to select one of the programming features listed in menu 1110. By selecting Favorites feature 1410 of menu 1110, the user accesses Favorites submenu 1420 on Favorites GUI 1400 which offers several choices concerning the Favorites feature. For example, in this instance the user can choose from: creating a new profile, deleting an existing profile, adding parameters to an existing profile, finding favorite channels or shows and excluding channels.

If the user wants to find a program that meets the parameters of the user's existing Favorites profile, the "Find Favorite Shows" feature is selected from the Favorites submenu 1420, and a listing of all of the programs that meet such criteria is displayed (1440). The user can then reserve, play or delete a program from the displayed Favorites list. Other options are available and are described below.

Figure 16:
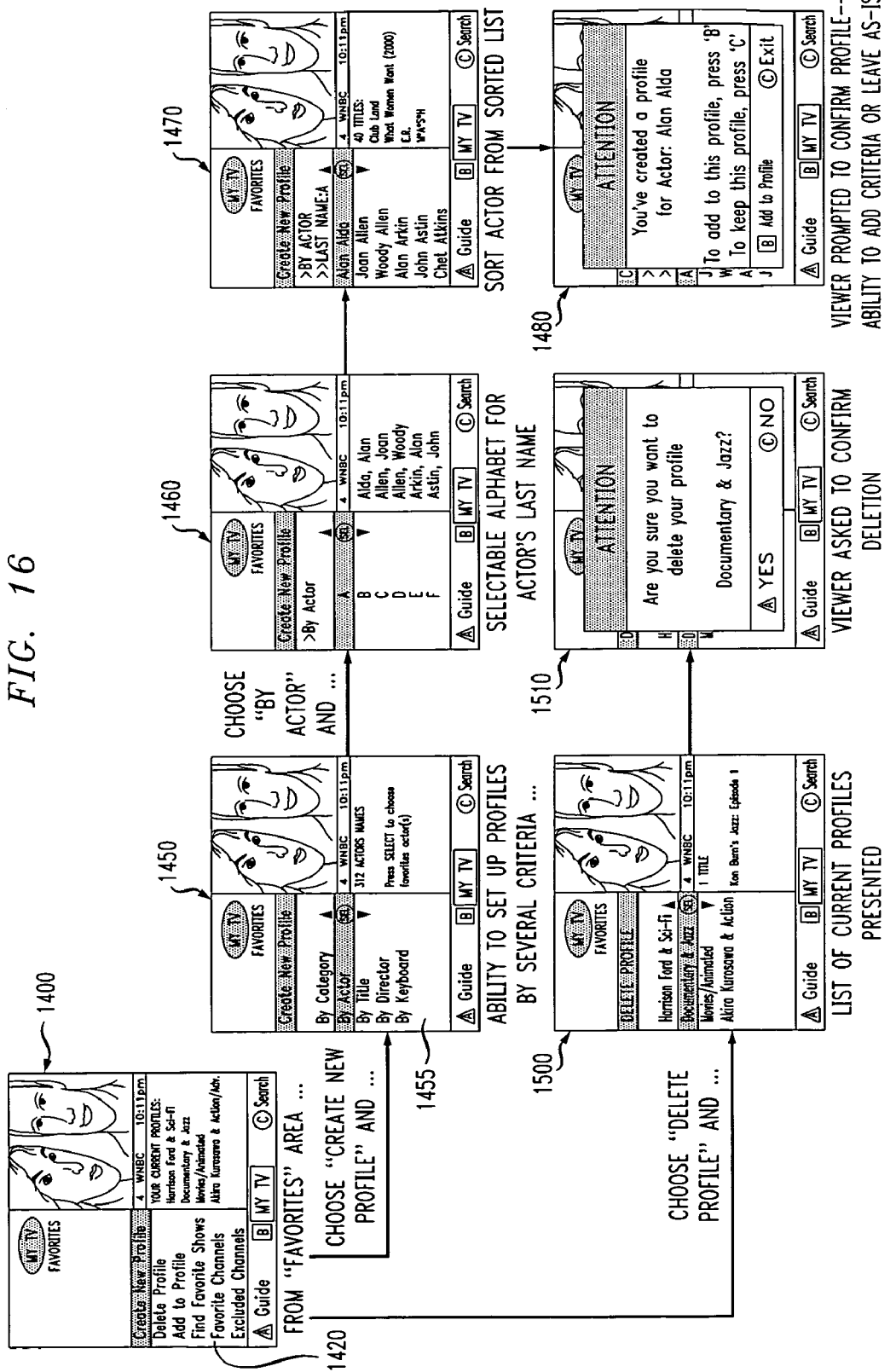
FIG. 16 illustrates screen displays in changing and deleting profiles in the Favorites GUI in accordance with the invention.

Referring to FIG. 16, a user may create a new profile by using select key 960 of remote control 900 to select the "Create New Profile" link from Favorites submenu 1420 to display search parameters from which a user may choose (1450). These parameters may include programming category, actor(s) name, program title, director, keyword and the like. FIG. 16 illustrates the method of creating and deleting a favorites profile in accordance with one aspect of the invention. Once the "Create New profile" display is accessed (1450) from the favorites GUI (1400), the user is prompted to set up a profile by selecting from several criteria (1455). If, for example, the criteria chosen is "By Actor," the user is prompted to select an actor for allocation to its Favorites profile. In one embodiment, the names are listed in alphabetical order (1460). Once the desired actor is selected, a list of programs that includes the selected actor is displayed and the total number of program titles meeting such profile is also included (1470). The user is then asked to decide whether the profile should be added to an already existing profile (by pressing "B" key 940 of remote control 900) or whether the criteria selection should be saved as a new profile (by pressing "C" key 950 of remote control 900). In one embodiment, a user may have multiple profiles. For example, a user may wish to have one profile on the weekends and another during the week. Similarly, a user may create a profile which provides a user access to all available programming on a certain topic. For example a profile relating to cooking may include in-progress broadcasts, past broadcasts and out-of-market cooking programs. In such circumstances, the user may associate a descriptive name to the profile (such as "Weekend Programs", "My Cooking Stations", etc.) and access each of the multiple profiles at different times.

A user may also choose to delete a profile. This is accomplished by using select key 960 of remote control 900 to select the "Delete Profile" link from favorites submenu 1420 and thereby displaying the profiles already created and saved by a user (1500). After the user makes a confirmation (1510), the profile is then deleted from the user's list of profiles.

The "Favorites" menu also enables a user to "Find Favorite Shows" which, when this option is selected, terminal 158-1 displays all programs that meet the current profile criteria for all profiles. Once a user has defined at least one profile, the user can, through the user interface, automatically search program data and then view all programs that match any profiles in the user's Favorite Shows (1440). To view a program, the user selects Favorite Shows (1440), selects a show in the list and then terminal 158-1 presents to the user the playback options.

A user can also designate "Favorite Channels" which are channels that are often watched by a user. A channel may be designated as a "Favorite Channel" by selecting "Favorite Channels" from the Favorites menu 1420 or by pressing FAV key 980 of remote control 900. Once a user has defined one or more Favorite channels, the user can toggle interactive program guide 1020 to display only Favorite channels and re-toggle back to the full list of channels. Channels can further be managed by defining a list of Excluded Channels from Favorites menu 1420. These channels are then skipped when a user channels up or down.

Special Services

Figure 17:
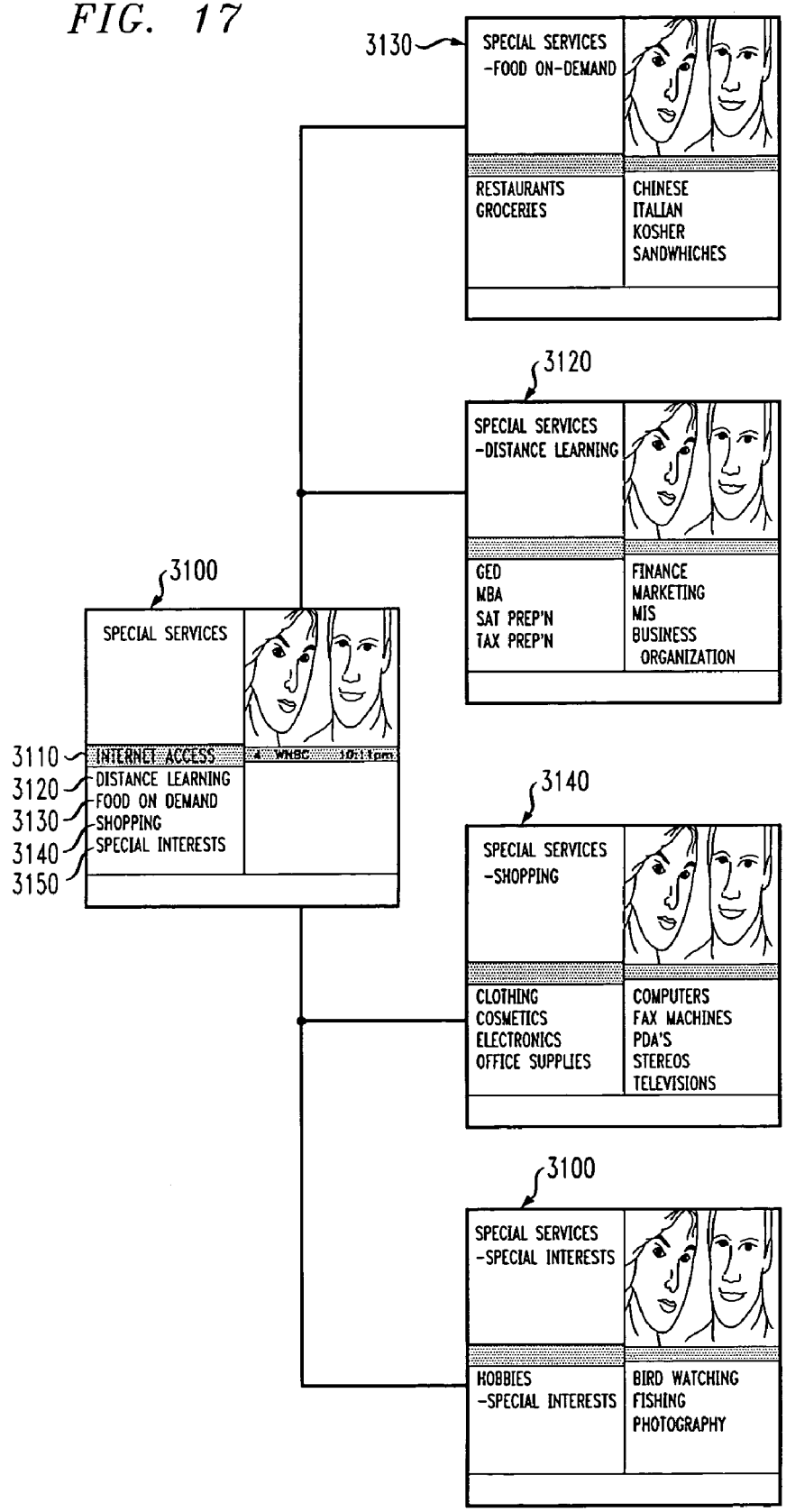
FIG. 17 illustrates screen displays in accessing different Special Services features in accordance with the invention.

As shown in FIG. 17, special services 3100 may be accessed by the user interface and, in one embodiment, may include Internet Access 3110 (including AOL, e-mail, AIM, keyword searching, etc.), Distance Learning 3120, Food On Demand 3130, Shopping 3140 and Special Interests 3150.

In one embodiment, a user may select Distance Learning (3120) to access a wide array of educational programs. For example, in the Distance Learning feature, terminal 158-1 may display program offerings relating to earning a GED or MBA, SAT preparation courses, tax preparation courses and the like. A user may access a specific course or course program by selecting from a menu of educational program categories and then choosing the specific course or course program that is desired. If the user highlights a specific course or course program and depresses info key 990 of remote control 900, terminal 158-1 displays information concerning the course.

Through the user interface, the user can also access Food On Demand (3130) which provides information concerning local restaurants or groceries. In one embodiment, a user that accesses Food On Demand is prompted by terminal 158-1 to enter a food type such as Chinese, Italian, Kosher, Sandwiches, etc. The user is then prompted to select whether information concerning restaurants or groceries is desired. In response to these parameters, relevant information is provided to the user. For example, if a user selects Chinese for food type and restaurant as venue, then a listing of Chinese restaurants in the user's geographic area is displayed. By selecting one of the listed restaurants, the user can access, via terminal 158-1, certain basic information such as description of restaurant and restaurant location and hours. By pressing info key 990 of remote control 900, the user can access advanced information including the restaurant's menu, photographs of the restaurant and real time seating availability and reservations. Similar type of information is available concerning grocers listed with the Food On Demand feature including available food items, prices, store location and hours.

Through the user interface, a user can also access information for purchasing goods. The Shopping feature (3140) enables a user to access basic information and advanced information concerning a wide array of goods. In one embodiment, by choosing the Shopping feature, headend 105 generates an initial list which includes broad categories of goods such as clothing, electronics, office supplies, cosmetics, etc. When the user selects a listed category, subcategories of goods are then displayed. An example of subcategories for the electronics category may include computers, televisions, stereos, PDA's, fax machines, etc. Once a subcategory is selected, specific goods relating to the selected subcategory is listed. Similar to Food On Demand, a user can access basic information and advanced information about a selected good. For example, if an HP fax machine is selected, basic information may include certain specifications and pricing information concerning the fax machine. By selecting info key 990 of remote control 900, advanced information including retail stores that sell the fax machines and a video demonstration of the fax machine is made available to the user via terminal 158-1.

Through the user interface, the user can also access Special Interests (3150). By accessing the Special Interests feature, a user may access a list of Hobbies or a list of Special Interests. The list of Hobbies may include fishing, photography, bird watching and the like. Accessing a specific hobby within the Hobbies list enables a user to access basic information and advanced information concerning such hobby. For example, if a user accesses bird watching, basic information including a description of the hobby is provided. By pressing info key 990 of remote control 900, the user may learn advanced information concerning bird watching including organized local field trips, bird watching books that are for sale, recommended bird watching equipment such as binoculars, etc. The Special Interests feature also offers basic and advanced information concerning special interests such as public speaking, religion, etc.

Settings

Various Settings enable customization of the operation and navigation of the user interface. In one embodiment, such settings may include: Blocked Channels, Excluded Channels, Power On Channel, Power On Timer, Power Off Timer, SAP and Out-Of-Market.

Excluded Channels are those channels that a user programs to be temporarily skipped when the user at terminal 158-1 is channeling up or down. A user may choose to exclude a channel because it is rarely viewed by the user and therefore it is more convenient for the user not to have to navigate through such channel.

Blocked Channels are those that are key protected and prevents unauthorized viewing of such channels. One example in which channels are blocked is where parents want to restrict access of one or more channels to their children because the content offered by such channels may be considered inappropriate.

Power On Channel is a setting that allows a users to program a specific channel to be tuned each time that terminal 158 is turned on. For example, avid sports fans may always want their terminal to turn on to ESPN.

Terminals 158 may also have power on and power off timers. A power on timer enables the terminal to turn on at one or more predetermined times during designated days. For example, a user that wakes up for work at 6:00 a.m., Monday through Friday, may want to set the terminal to automatically turn on at such time. Similarly, power off timer designates a specific time in which the terminal is turned off. In another embodiment, a user can program the terminal to turn off after a certain amount of time has transpired (e.g., 2 hours).

"Out Of Market" is a feature that enables a person who is located in a certain geographic area to access multimedia content from another geographic area. For example, if a user who lives in New York City travels to Los Angeles for two weeks, the user may want to access local New York City news. By accessing the Out Of Market feature, the user may choose media content that is geared toward the specific market for which the user is particularly interested. This is accomplished by first creating an Out Of Market profile. For example, a profile with the name "NY News" may be created by a user who wishes to reserve local news programs broadcast Over New York TV channels. When the user travels out of the marketplace (for example, to Los Angeles), the reserved Out Of Market programming may be accessed when the user inputs the appropriate personal identification number and profile name.

What's Hot

Figure 18:
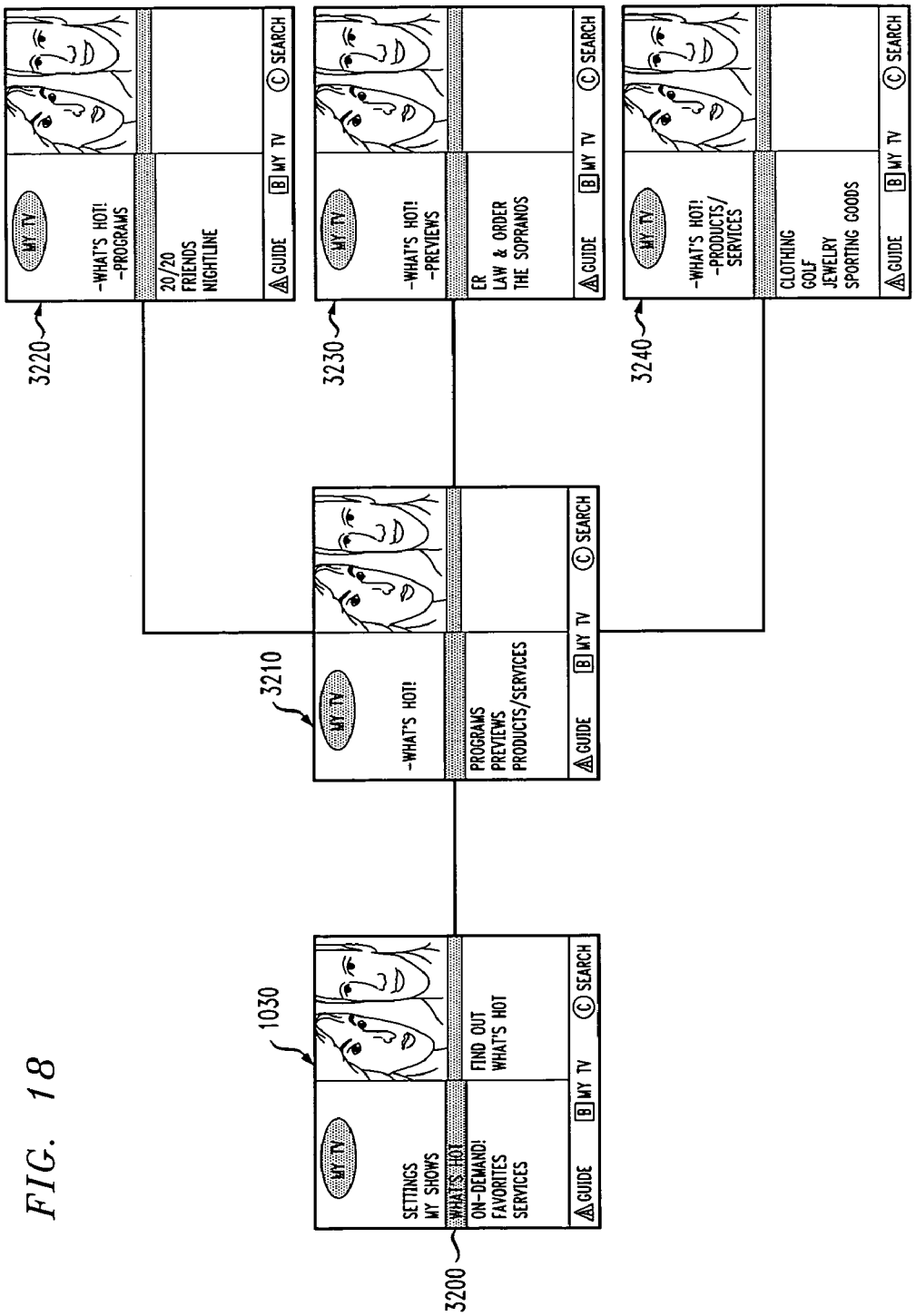
FIG. 18 illustrates screen displays in accessing a What's Hot GUI in accordance with the invention.

The "What's Hot" feature offers users convenient access to programs, products and services that are or expected to be in popular demand. Access to the What's Hot feature according to one embodiment of the invention is shown in FIG. 18. By accessing the What's Hot feature 3200 of menu 1110, What's Hot submenu 3210 is accessed. From the What's Hot submenu, a user at terminal 158-1 can, for example, view a listing of the most popular programs 3220 that have been broadcast or those that have yet to be broadcast but are expected to be in high demand. A user can then reserve one or more of the listed programs for viewing.

What's Hot feature 3200 also enables a user to view previews 3230 of popular programs and, at any time during the preview, the user can reserve the program that is being previewed. If the program is one that has been broadcast, then the user can play the program immediately or at some time in the future. If the preview relates to a program that has yet to be broadcast, the program may be reserved during the preview, and the user can play back the reserved program after the program is broadcast.

What's Hot feature 3200 also offers users access to information concerning popular products and services (3240). In one embodiment, these products may be listed by categories, such as sporting goods, jewelry, clothing, golf lessons and the like. In another embodiment, these products and services may be listed alphabetically by product or service name. A user can select a product or service from the What's Hot product/service list and access information, including basic and advanced descriptive information.

For example, if a new line of motorboats has recently been released in the marketplace, the user interface may display information concerning the specifications and sale of such boats. In one embodiment, a user may first access basic information about the boat by selecting the motorboat product name from the list of products and services. Basic information may include physical dimensions of the boat, its speed, suggested retail price, etc. The user may then press info key 990 on remote control 900 to access advanced product information. Advanced product information may include retail stores that sell the boat and directions to and hours of operation of identified stores. Advance product information may also include a video showing the boat in operation.

Network Home Screen

Figure 19:
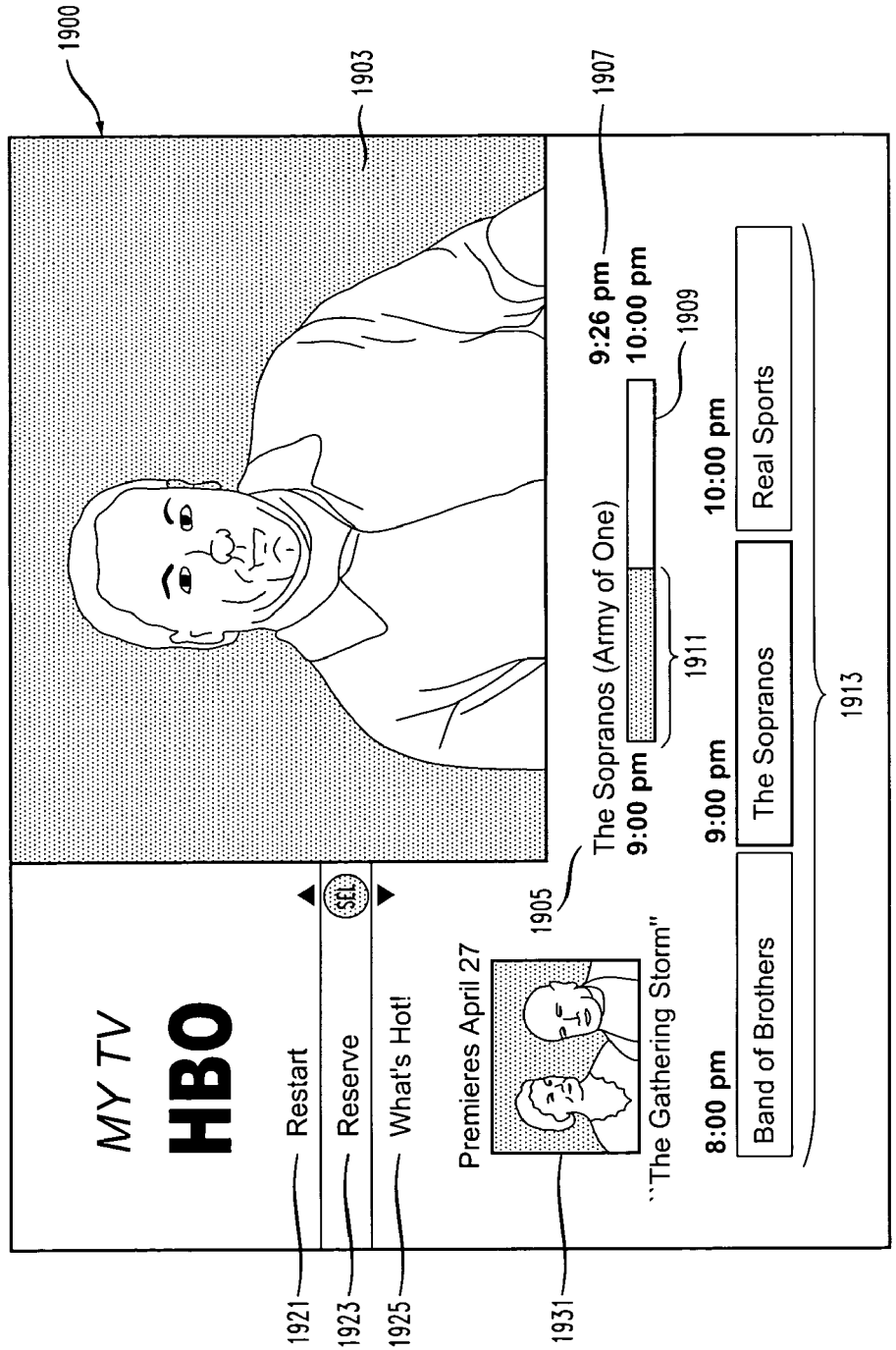
FIG. 19 illustrates a network home screen in accordance with the invention.

A user in this instance may access network home screen 1900 in FIG. 19 through interactive program guide 1020. As mentioned before, rights to all or some of the program materials on certain channels may have been negotiated and acquired from their providers. In accordance with an aspect of the invention, these rights-acquired channels are indicated on the program guide differently, e.g., in a different color, than other listed channels. In this example, let's say rights to all program materials on the HBO channel have been acquired, which thus is indicated as a rights-acquired channel on the program guide. For instance, by highlighting the HBO channel on the guide and pressing info key 990 on remote control 900, the user is able to access network home screen 1900, which concerns the HBO channel in this instance.

As shown in FIG. 19, screen 1900 comprises window 1903 which displays thereon an in-progress HBO program, i.e., the "Sopranos" in this instance. The title of the in-progress program denoted 1905 appears under window 1903. The current time denoted 1907 also appears under window 1903. A time bar denoted 1909 is used to indicate the progression of the in-progress program. One end of time bar is marked with the start time of the in-progress program (i.e., 9:00 p.m. in this instance), and its other end is marked with the end time thereof (i.e., 10:00 p.m. in this instance). The same start and end times of the in-progress program are indicated on micro-grid or micro-guide 1913, along with those of the programs contiguous to the in-progress program. Time bar 1909 has marking 1911 thereon for graphically indicating the proportion of the program which has been broadcast. If the user wants to view the in-progress program from the beginning thereof, the user may use navigation keys 985 on remote control 900 to cause a "Restart" option (denoted 1921) to be highlighted, and selects the option by pressing select key 960. If the user wants to reserve the in-progress program for later viewing thereof, the user may similarly select a "Reserve" option, denoted 1923. If the user wants to take advantage of the above-described What's Hot feature to reserve certain HBO programs through their promotional previews, the user may select a "What's Hot!" option, denoted 1925. Similar to a What's Hot preview, a thumbnail preview, denoted 1931, may be used to reserve the program (e.g., "The Gathering Storm") featured in the preview in advance of the broadcast of the program (e.g., on April 27). To make such a reservation, the user may highlight and select preview 1931.

Music on Demand

Figure 20:
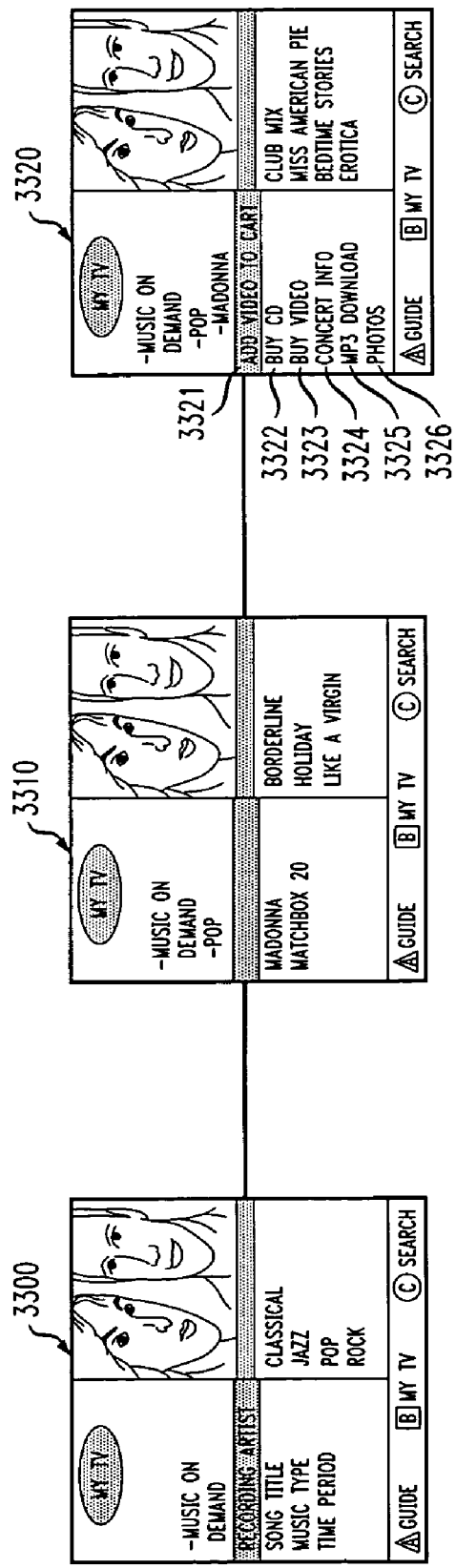
FIG. 20 illustrates screen displays in accessing different Music-On-Demand features in accordance with the invention.

Referring to FIG. 20, through the user interface, an interactive music video feature called Music On Demand may be accessed. Music On Demand enables a user to search for videos by categories 3300, including recording artist name, song title, music type (jazz, rock, classical, etc.), time period (60's, 70's, 80's), and the like, as well as associated subcategories 3310. Upon selecting a video for viewing, a user at terminal 158-1 can access several Music On Demand options 3320 by pressing info key 990 on remote control 900, including Add Video to Shopping Cart 3321, Buy CD 3322, Buy Video 3323, Concert Information 3324, MP3 Download 3325 and Photos 3326.

The Add Video to Shopping Cart feature 3321 enables a user to reserve a music video such that it can be recalled for viewing at any time. In one embodiment, the user may "rent" the video—that is, for a certain price, the user can access the video for a predetermined time period (such as a month). In another embodiment, the user may "buy" the video—that is, for a certain price, the user has extended term access to the video (such as one year or unlimited access).

The Buy CD feature 3322 enables a user to purchase a recording of the artist that is performing the video that is being currently viewed by the user. In one embodiment, a list of CD's that contains the performed song by the performing artist is displayed. In another embodiment, all CD's recorded by the performing artist is displayed by terminal 158-1 for purchase by the user. Similarly, the user will have the option to (1) buy a recording of the video by selecting the Buy Video feature (3223); (2) download an MP3 recording of a song or CD recorded by the viewed artist by selecting the Download MP3 feature (3224); or (3) download photographs of the recording artist by selecting the Photos feature (3225).

The Concert feature (3226) enables a user that is a watching a music video to access concert information relating to the recording artist. Concert information may include location, date and time of the concert, ticket availability and pricing, as well as a link to purchase tickets.

Sports

Figure 21:
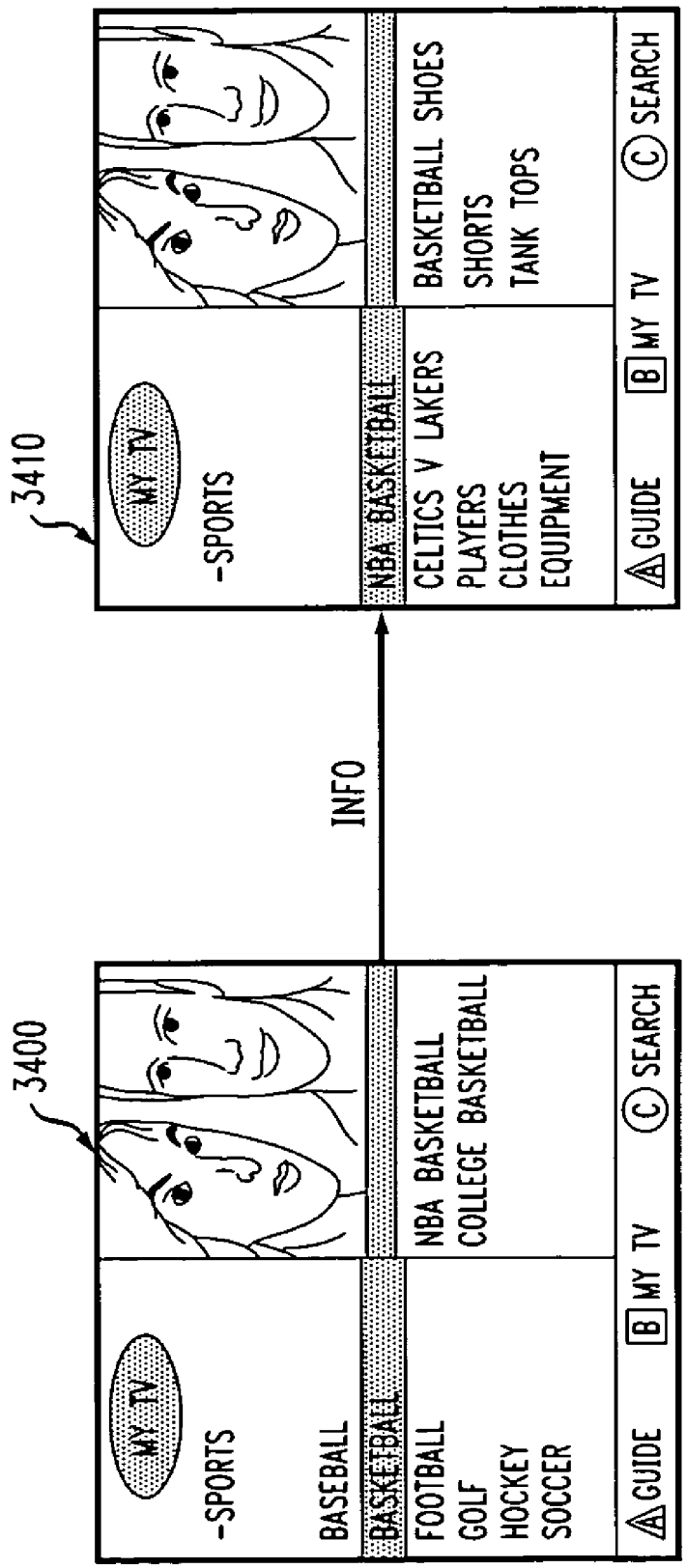
FIG. 21 illustrates screen displays in accessing different Sports features in accordance with the invention.

Referring to FIG. 21, through the user interface, convenient access to sports programs and information relating to such programs may be provided. The Sports feature (3400) enables a user to search for sports programs by reviewing menus for selecting the type, subtype and specific sports program to be viewed (3410). The types of sports programs may include basketball, baseball, hockey, soccer, football, golf, etc. If, for example, a user selects basketball, several subtypes may be displayed including NBA basketball, college basketball, and the like.

When a sports program is reserved and viewed, the user at terminal 158-1 can access information concerning the viewed program. In one embodiment, when the user depresses info key 990 of remote control 900, a menu is displayed for accessing information concerning the sport being viewed, the specific game being viewed, the specific players being viewed and other items of interest relating to the viewed sports program, including information about the sports equipment used and clothing worn by the players.

Searching

In one embodiment of the invention, based on the data associated with a program or event, users can search for content including On Demand programs, Pay-Per-View, broadcast and Out Of Network programs. Users can find programs and events by searching for certain criteria including actor, title, keyword, year/season, genre, rating and the like. A search may include one of these parameters or multiple parameters.

Figure 22:
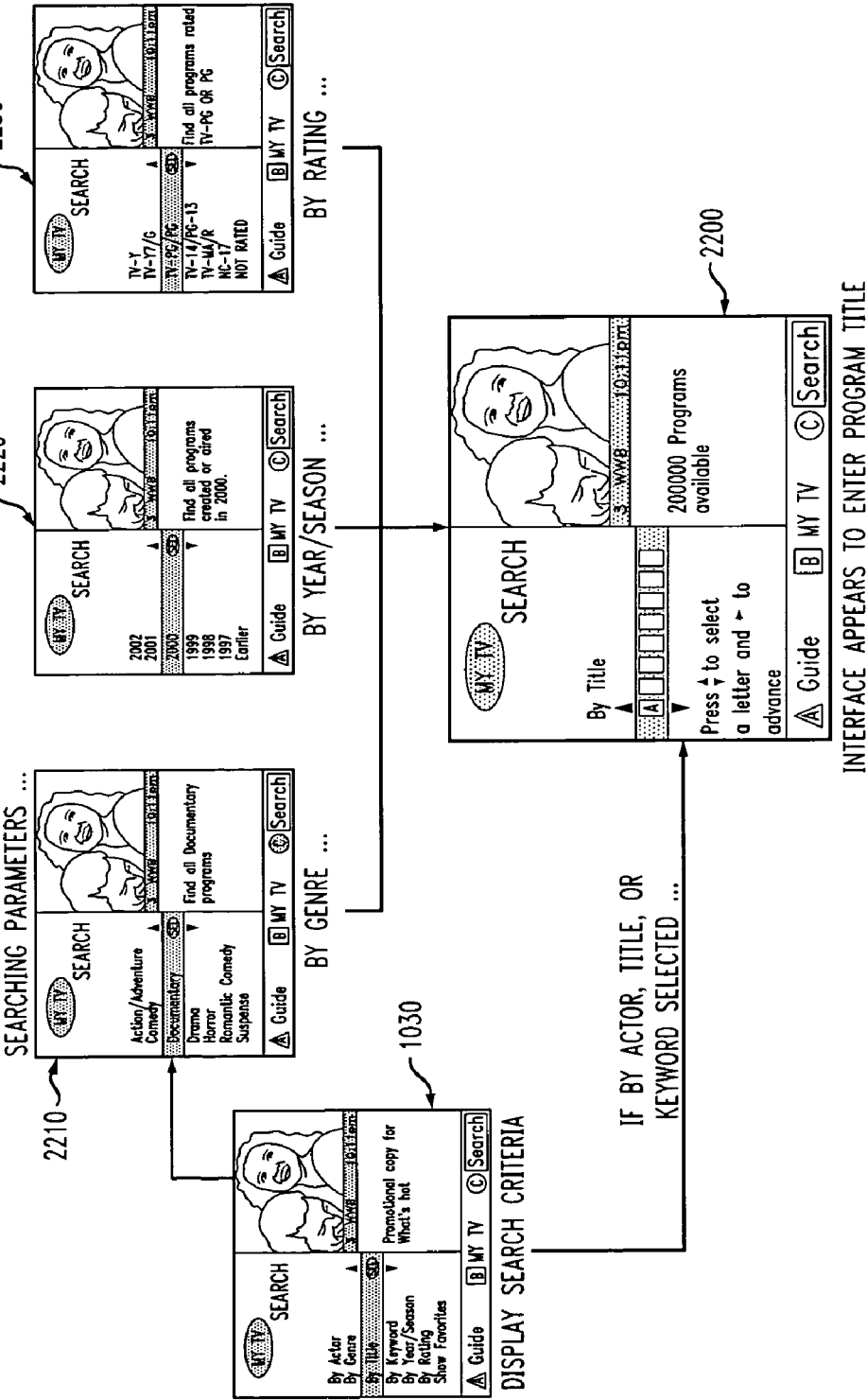
FIG. 22 illustrates screen displays in conducting searches in accordance with the invention.

To access Searching, a user at terminal 158-1 depresses Search key 995 of remote control 900. Once Searching is accessed, a user can then complete a Search. FIG. 22 illustrates the process of creating a search. Search GUI 1030 may be accessed from the home GUI 1030. As shown in FIG. 22, different search parameters may be used. For example, a user can search for content by entering text relating to an actor's name, program title or any other keyword (2200). In another embodiment, by selecting genre, a user can choose from action/adventure, comedy, documentary, drama, horror, romantic comedy or suspense (2210). A user may also search for content by selecting a listed year (2220) or listed rating (i.e., TV-Y, NC-17, etc.) (2230). When the genre, year and/or rating parameters are used for searching, a user may be prompted to use an additional text search to reduce the number of programs listed in a requested search result. In one embodiment, a predetermined maximum number of results (e.g., 50) for a given search may be imposed. If the predetermined maximum is exceeded, the user may be prompted to further limit the search.

Commercial Targeting and Playback Monitoring

In one embodiment of the present invention, headend 105 is capable of varying advertising content included in reserved broadcasts and media processor 119 monitoring user viewing patterns concerning commercials.

By monitoring the content reserved and viewed by a user, headend 105 can create a profile relating to a user's interests. This information may then be used to target advertising that would be of most use and interest to the user and therefore most effectiveness to advertisers. Because reserved programs are recorded prior to distribution to a user, a content provider has the ability to vary advertising content prior to distributing a program to terminal 158.

Commercial monitoring can provide useful marketing information to advertising companies and the companies that pay for the production and distribution of these commercials. When viewing a program, users often change channels during commercials. Further, when viewing a past program that has been reserved, a user has the additional capability of fast-forwarding through the commercials. Because a commercial is only effective if it is viewed by its intended audience, monitoring whether a user has changed a channel or fast forwarded a program to avoid viewing a commercial can provide useful information to advertisers. Similarly, identifying the commercials that tend to be watched by a higher percentage of the intended audience is valuable information to the advertisers and companies that market the advertised products or services.

Figure 23:
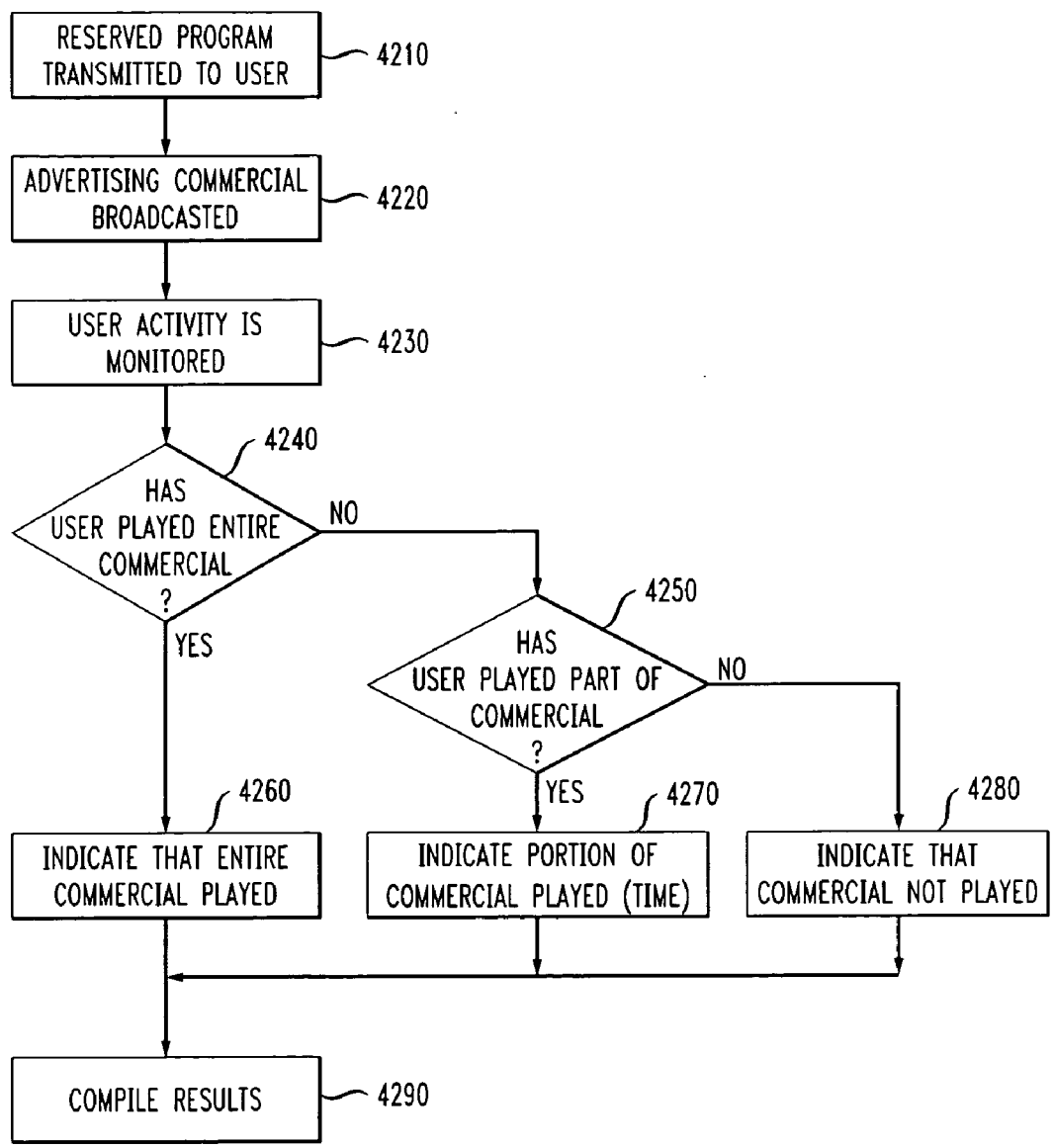
FIG. 23 is a flow chart depicting a process for monitoring user responses to a commercial playback in accordance with the invention.

FIG. 23 illustrates the Commercial Playback Monitoring feature in accordance with one embodiment of the invention. In step 4210, a reserved program is transmitted to a user. At some point during the program, a commercial is broadcast to the user (step 4220) and user activity is monitored (step 4230). In one embodiment, media processor 119 recognizes that a commercial has been presented by detecting tones that are embedded in the reserved program. These tones are embedded at the beginning and at the end of the commercial so that the monitoring functionality of media processor 119 can be automatically powered on and off as a commercial begins and ends.

When a commercial is broadcast and the monitoring functionality is turned on, media processor 119 detects if the entire commercial is played by the user (step 4240), a portion of the commercial is played or whether the commercial has not been played at all (step 4260). If the entire commercial is played, media processor 119 generates a data point at step 4260 indicating that the user has played the entire commercial. If, however, the entire commercial has not been played, media processor 119 similarly generates a data point at step 4280 indicating that the user has not played the commercial at all. Alternatively, if a portion of the commercial has been played, media processor 119 records the amount of time that the user played the commercial (step 4270). This data is then compiled by media processor 119.

By performing such monitoring, a content provider can collect certain information relating to a commercial's effectiveness including determining the percentage of viewers that watched a specific commercial, which group of user watched and which did not watch the commercial (such as those tuning in to sports programs versus those tuned in to news programs), at what point in the commercial was it no longer played, whether the same user played the same commercial multiple times, and the like.

Picture in Picture (PIP) Programming

In an illustrative embodiment of the invention, a content provider may provide a video stream that appears to a user to be a picture in picture (PIP) broadcast, with multiple programs juxtaposed next to one another. The PIP format may be predefined. For example, in providing a sports PIP package, the PIP format may be defined as having programs from ESPN, ESPN2, ESPN Classic, and ABC Sports displayed on four quadrants of the TV screen, respectively.

In another embodiment, because all programs are recorded at headend 105, a video stream may be provided by the cable operator which represents multiple recorded programs juxtaposed next to one another. Accordingly, headend 105 may receive from a user at a set-top terminal a PIP request, where the PIP format and/or make-up of the displayed programs may be predefined, or selected by the user. In response to such a request, the content of appropriate recorded programs are arranged in headend 105 in a proper format to develop the PIP multicast receivable by the user's set-top terminal.

Further, by using navigation keys 985 of remote control 900, the user may select one of the PIP displayed programs to play the associated audio.

Messaging Service

In this illustrative embodiment, The messaging services provided in system 100 include system messaging, subscriber content level messaging, and subscriber-to-subscriber messaging services. The types of message provided by each messaging service may be accorded different priorities, and the receipt of certain types of message may be optional. For example, the system messaging service may provide system messages concerning, e.g., emergency information, hot news, etc. The emergency information messages may be accorded a higher priority than hot news messages. In this example, a user may be able to opt out receipt of the hot news messages but not the emergency information messages because of their higher priority. In addition, the system messages may be geographically specific. For example, system messages pertaining to a geographic area are provided to the users in that geographic area only (e.g., having specified zip codes)

The subscriber content level messaging service provides messages which may be directed to specific users at a group level or sometimes even at a personal level. Users of system 100 may be grouped according to their program viewing habit. For example, those users who request baseball programs frequently may be grouped as baseball fan-users. Thus, the messaging service in question may from time to time provide targeted messages concerning baseball games, equipment, etc. to such baseball fan-users. In addition, the messaging service may provide personal messages to a user, including messages concerning the user's account, an expiration of the user's reserved program, etc.

The subscriber-to-subscriber messaging service may be realized by taking advantage of the aforementioned RDCs for communicating upstream data, the aforementioned FDCs for communicating downstream data, and network controller 125. To that end, a messaging interface, e.g., a GUI, may be invoked by a user on screen to read, compose, send, reply or forward messages. It should be noted that users at set-top terminals in system 100 are identified by their user account IDs which are assigned thereto when the users register with the messaging service.

For example, a first user at a first set-top terminal, say, terminal 158-1 in FIG. 1, may send through the messaging interface a message to a second user at a second terminal, which may or may not be in the same neighborhood as terminal 158-1. Such first and second users are identified by their respective user account IDs in the message. Accordingly, terminal 158-1 may packetize the message into one or more packets, depending on the length of the message. Each packet in this instance contains, among others, a sequence number for ordering the packet at the receiving terminal, a destination address (e.g., the IP address of network controller 125) and an origination address (e.g., the first terminal IP and/or MAC address). After terminal 158-1 transmits the packet through an RDC, the packet is routed to network controller 125 based on the destination address therein. It should be noted at this point that network controller 125 contains a table for translating a user account ID to the corresponding IP address of the user terminal. Upon learning the second user account ID in the leading packet, network controller 125 looks up in the table the IP (and/or MAC) address of the corresponding second terminal, for which the message is ultimately destined. Network controller 125 then sends a notice to the second terminal via an FDC, informing the latter of the receipt of a message from the first user identified by his/her user account ID. In response to such a notice, the second user at the second terminal may acknowledge that he/she is ready to receive messages. In that case, the second terminal generates a positive acknowledgment to network controller 125. In response, network controller 125 replaces the original destination address in the received packets with the IP (and/or MAC) address of the second terminal, thereby redirecting the packets to the second terminal. The second terminal receives the packets via an FDC, which contain the origination address identifying the originating, first terminal. Conversely, the second user may communicate with the first user through the messaging interface provided by the second terminal, thereby realizing the subscriber-to-subscriber messaging service. Subsequent messages may continue to flow between the two terminals until either terminal sends an end-of-transmission (EOT) message to network controller 125.

In the event that after sending the aforementioned message receipt notice to the second terminal, network controller 125 receives a negative acknowledgment or no response therefrom, the message is retained in network controller 125 for later retrieval by the second terminal. Network controller 125 then informs the first terminal of the negative acknowledgment or non-response from the second terminal.

The foregoing merely illustrates the principles of the invention. It will thus be appreciated that those skilled in the art will be able to devise numerous other arrangements which embody the principles of the invention and are thus within its spirit and scope.

For example, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for delivering, through a communications network, program content to a terminal at a user location, the system comprising:

a processor remote from the user location for recording the program content during a broadcast of the program content according to a broadcast schedule and storing the recorded program content in storage, the recorded program content comprising, at least in part, I-frames defining the program content, each I-frame being identified by a respective I-frame identifier;

the processor further creating, at least in part during the broadcast of the program content according to the broadcast schedule, at least one file separate from the recorded program content, the at least one file comprising an array of selected I-frame identifiers identifying respective I-frames of the recorded program content without the respective I-frames, for delivering manipulated recorded program content during at least the broadcast of the program content according to the broadcast schedule, wherein the selected I-frame identifiers identify fewer than all of the I-frames of the recorded program content, the at least one file being stored in storage separate from the recorded program content;

a mechanism for delivering, through the communications network, the program content to the terminal according to the broadcast schedule;

an interface for receiving, from the terminal, a request for performing an action on the recorded program content at least during the broadcast of the program content; and a control unit responsive to the request for manipulating the recorded program content to meet the request, based, at least in part, on at least one of the at least one files.

2. The system of claim 1 being connected to the communications network which includes a cable network.

3. The system of claim 1 wherein the action causes a perception of at least one of rewinding or fast-forwarding a delivery of the program content.

4. The system of claim 1 wherein the request includes data identifying the terminal.

5. The system of claim 4 wherein the data concerns an Internet protocol (IP) address of the terminal.

6. The system of claim 4 wherein the data concerns a media access control (MAC) address of the terminal.

7. The system of claim 1 further comprising a cache for storing the recorded program content.

8. The system of claim 1 wherein the program content delivered to the terminal includes the recorded program content.

9. The system of claim 1, wherein the system is configured to:
select a transport stream for delivering the program content to the terminal; and
identify a carrier frequency for carrying the selected transport stream;
wherein the control unit causes delivery of the manipulated recorded program content to the terminal, via the transport stream.

10. The system of claim 9, wherein:
the system is configured to select the transport stream from among transport streams detected by the terminal.

11. The system of claim 10, configured to:
determine a capacity required to transmit the program content; and
determine the transport stream based, at least in part, on the required capacity.

12. The system of claim 11, configured to multiplex the program content with other program streams in the selected transport stream.

13. The system of claim 1, wherein the program content of complete programs is recorded, the system further comprising:
memory to store the recorded program content of the complete programs for delivery to a second terminal, upon a request for the complete program content from the second terminal received after completion of broadcast of the program content according to the broadcast schedule;
wherein the processor records all program content during broadcast of the respective program content according to the program schedule.

14. The system of claim 1, wherein:
the program content is recorded by the processor during broadcast of the program content to the terminal according to the broadcast schedule; and
the program content delivered by the mechanism is the recorded program content.

15. The system of claim 1, wherein the at least one file is created as the program content is received.

16. The system of claim 1, wherein:
the processor receives the program content in compressed form; and
the at least one second file is based, at least in part, on the compressed program content.

17. The system of claim 1, further comprising:
memory to store the recorded program content;
wherein the control unit manipulates the recorded program content by retrieving the respective I-frames identified by the I-frame identifiers in the at least file, from the recorded program content; and
the mechanism delivers the retrieved I-frames through the communications network.

18. A system for providing program content to a terminal through a communications network, the system comprising:
a first interface for receiving content of an in-progress program from a source via broadcast, the in-progress program content comprising, at least in part, I-frames defining the program content, each I-frame being identified by a respective I-frame identifier;
a memory for storing the in-progress program content during the broadcast of the in-progress program content according to a broadcast schedule, the stored in-progress program content comprising, at least in part, the I-frames defining the program content;
the memory further storing, during the broadcast of the in-progress program content according to the broadcast schedule, separate from the recorded program content, at least one file based on the content of the in-progress program content for manipulating recorded program content during at least the broadcast of the program content according to the broadcast schedule, the at least one file comprising an array of selected I-frame identifiers identifying respective I-frames of the recorded program content without the respective I-frames, wherein the selected I-frame identifiers identify fewer than all of the I-frames of the recorded program content;
a mechanism for providing first signals containing the in-progress program content onto the communications network, the terminal in response to the first signals helping recover the in-progress program content in perceivable form;
a second interface for receiving from the terminal through the communications network a request for performing an action on the stored in-progress program content at least during the broadcast of the in-progress program content; and
a control unit responsive to the request for providing second signals containing at least part of the stored in-progress program content to the terminal through the communications network to realize the action on the stored in-progress program content based, at least in part, on at least one of the at least one files.

19. The system of claim 18 wherein the program content is formatted pursuant to an MPEG standard.

20. The system of claim 18 wherein the first signals include quadrature amplitude modulated (QAM) signals.

21. The system of claim 18 wherein the memory includes a cache.

22. The system of claim 18 wherein the perceivable form includes at least one of a viewable form and an audible form.

23. The system of claim 18 being connected to the communications network which includes a cable network.

24. The system of claim 18 wherein the action causes a perception of at least one of rewinding or fast-forwarding a provision of the program content.

25. The system of claim 18 wherein the request includes data identifying the terminal.

26. The system of claim 25 wherein the data concerns an IP address of the terminal.

27. The system of claim 25 wherein the data concerns a MAC address of the terminal.

28. The system of claim 18 wherein the program content contained in the first signals includes the recorded program content.

29. The system of claim 18, wherein the at least one file comprises at least one rewind file for rewinding the in-progress program content.

30. The system of claim 29, wherein the at least one rewind file comprises an array of selected I-frame identifiers corresponding to the in-progress program content, in a reverse direction.

31. The system of claim 29, wherein the at least one file further comprises at least one fast forward file adapted to fast forward the in-progress program content.

32. The system of claim 31, wherein the at least one fast forward file comprises an array of selected I-frame identifiers corresponding to the program content, in a forward direction.

33. The system of claim 18, wherein the at least one file comprises at least one fast forward file for fast forwarding the in-progress program content.

34. The system of claim 33, wherein the at least one fast forward file comprises an array of selected I-frame identifiers corresponding to the program content, in a forward direction.

35. The system of claim 18, wherein the first processor creates a metadata file to associate with the recorded program content.

36. The system of claim 18, wherein:
the control unit provides the second signals by retrieving the respective I-frames identified by the I-frame identifiers in the at least file, from the recorded program content; and
the mechanism provides the second signals onto the communications network.

37. The system of claim 18, wherein the in-progress program is received by the first interface in compressed form.

38. A method for delivering, through a communications network, program content to a terminal at a user location, the method comprising:
recording the program content at a location remote from the user location during a broadcast of the program content according to a broadcast schedule, the recorded program content comprising, at least in part, I-frames defining the program content, each I-frame being identified by a respective I-frame identifier;
creating, at least in part during the broadcast of the program content according to the broadcast schedule, at least one file separate from the recorded program content, the at least one file comprising an array of selected I-frame identifiers identifying respective I-frames of the recorded program content without the respective I-frames, for manipulating recorded program content, wherein the selected I-frame identifiers identify fewer than all of the I-frames of the recorded program content;
storing the at least one file separate from the recorded program content;
delivering, through the communications network, the program content to the terminal according to the broadcast schedule;
receiving, from the terminal, a request for performing an action on the recorded program content at least during the broadcast of the program content;
in response to the request, manipulating the recorded program content to meet the request based, at least in part, on at least one of the at least one files.

39. The method of claim 38 wherein the communications network includes a cable network.

40. The method of claim 38 wherein the action causes a perception of at least one of rewinding or fast-forwarding a delivery of the program content.

41. The method of claim 38 wherein the request includes data identifying the terminal.

42. The method of claim 41 wherein the data concerns an IP address of the terminal.

43. The method of claim 41 wherein the data concerns a MAC address of the terminal.

44. The method of claim 38 further comprising storing the recorded program content.

45. The method of claim 38 wherein the program content delivered to the terminal includes the recorded program content.

46. The method of claim 38, further comprising:
selecting a transport stream from among the identified transport streams for delivering the program content to the terminal based, at least in part, on a capacity required to transmit the recorded program content;
identifying a carrier frequency for carrying the selected transport stream; and
delivering the program content via the selected transport stream.

47. The method of claim 46, further comprising:
multiplexing the program content with other program streams in the selected transport stream; and
delivering the program content via the selected transport stream.

48. The method of claim 38, comprising manipulating the recorded program content to meet the request by:
retrieving the respective I-frames identified by the I-frame identifiers in the at least one of the at least one files, from the recorded program content; and
delivering, through the communications network, the retrieved I-frames.

49. A method for providing program content to a terminal through a communications network, the method comprising:
receiving content of an in-progress program, the in-progress program content comprising, at least in part, I-frames defining the program content, each I-frame being identified by a respective I-frame identifier;
storing the in-progress program content during a broadcast of the in-progress program content according to a broadcast schedule, wherein the stored in-progress program content comprises, at least in part, the I-frames defining the program content;
storing, during the broadcast of the in-progress program content according to the broadcast schedule, separate from the recorded program content, at least one file based on the content of the in-progress program content for manipulating recorded program content during at least the broadcast of the program content according to the broadcast schedule, the at least one file comprising an array of selected I-frame identifiers identifying respective I-frames of the recorded program content without the respective I-frames, wherein the selected I-frame identifiers identify fewer than all of the I-frames of the recorded program content;
providing first signals containing the in-progress program content onto the communications network, the terminal in response to the first signals helping recover the in-progress program content in perceivable form;
receiving from the terminal through the communications network a request for performing an action on the stored in-progress program content at least during the broadcast of the in-progress program content;
in response to the request, providing second signals containing at least part of the stored in-progress program content to the terminal through the communications network to realize the action on the stored in-progress program content, based, at least in part, on the at least one file.

50. The method of claim 49 wherein the program content is formatted pursuant to an MPEG standard.

51. The method of claim 48 wherein the first signals include QAM signals.

52. The method of claim 49 wherein the perceivable form includes at least one of a viewable form and an audible form.

53. The method of claim 49 wherein the communications network includes a cable network.

54. The method of claim 49 wherein the action causes a perception of at least one of rewinding or fast-forwarding a provision of the program content.

55. The method of claim 49 wherein the request includes data identifying the terminal.

56. The method of claim 55 wherein the data concerns an IP address of the terminal.

57. The method of claim 55 wherein the data concerns a MAC address of the terminal.

58. The method of claim 49 wherein the program content contained in the first signals includes the recorded program content.

59. The method of claim 49, comprising storing at least one rewind file for rewinding the in-progress program content.

60. The method of claim 59, wherein the at least one rewind file comprises an array of selected I-frame identifiers corresponding to the in-progress program content, in a reverse direction.

61. The method of claim 59, wherein the at least one file further comprises at least one fast forward file for fast forwarding the in-progress program content.

62. The method of claim 61, wherein the fast forward file comprises an array of selected I-frame identifiers corresponding to the program content, in a forward direction.

63. The method of claim 49, wherein storing the in-progress program content comprises storing at least one fast forward file for fast forwarding the in-progress program content.

64. The method of claim 63, wherein the at least one fast forward file comprises an array of selected I-frame identifiers corresponding to the program content, in a forward direction.

65. The method of claim 49, comprising:
providing the second signals by retrieving the respective I-frames identified by the I-frame identifiers in the at least file, from the recorded program content.

66. The method of claim 49, comprising:
receiving the content in compressed form.

* * * * *